United States Patent
Eagan et al.

(10) Patent No.: US 8,219,531 B2
(45) Date of Patent: *Jul. 10, 2012

(54) KNOWLEDGE ARCHIVAL AND RECOLLECTION SYSTEMS AND METHODS

(76) Inventors: George Eagan, Huntington, NY (US); Prabhdeep Singh, Coram, NY (US)

(*) Notice: Subject to any disclaimer, the term of this patent is extended or adjusted under 35 U.S.C. 154(b) by 490 days.

This patent is subject to a terminal disclaimer.

(21) Appl. No.: 11/927,510

(22) Filed: Oct. 29, 2007
(Under 37 CFR 1.47)

(65) Prior Publication Data
US 2008/0109486 A1    May 8, 2008

Related U.S. Application Data

(60) Continuation of application No. 11/927,499, filed on Oct. 29, 2007, now Pat. No. 8,010,553, which is a division of application No. 10/818,874, filed on Apr. 5, 2004, now Pat. No. 7,801,905.

(51) Int. Cl.
*G06F 7/00* (2006.01)
*G06F 17/00* (2006.01)

(52) U.S. Cl. ........ 707/667; 707/603; 707/672; 707/673; 705/32; 709/223; 709/224; 715/738

(58) Field of Classification Search .......... 707/722–780, 707/999.002–999.005, 603, 667, 672, 673; 705/32; 709/223, 224; 715/738
See application file for complete search history.

(56) References Cited

U.S. PATENT DOCUMENTS

| | | | | |
|---|---|---|---|---|
| 6,606,657 | B1* | 8/2003 | Zilberstein et al. | 709/224 |
| 6,795,856 | B1* | 9/2004 | Bunch | 709/224 |
| 6,832,176 | B2* | 12/2004 | Hartigan et al. | 702/178 |
| 2002/0111887 | A1* | 8/2002 | McFarlane et al. | 705/30 |
| 2003/0225989 | A1* | 12/2003 | Licalsi | 711/167 |
| 2004/0236650 | A1* | 11/2004 | Zapiec et al. | 705/32 |
| 2005/0223061 | A1* | 10/2005 | Auerbach et al. | 709/206 |

* cited by examiner

*Primary Examiner* — Shew-Fen Lin
(74) *Attorney, Agent, or Firm* — Jennifer Meredith, Esq.; Meredith & Keyhani, PLLC

(57) ABSTRACT

A method of timing and recording user activity in a knowledge archival and recollection system, the method comprising: configuring an activity tracking module; logging into the knowledge archival and recollection system; prompting the user with a task identifier input interface upon opening an application user interface; initiating a timer upon input into the input interface; stopping the timer upon inactive application interface; and storing timer data into a database server.

2 Claims, 27 Drawing Sheets

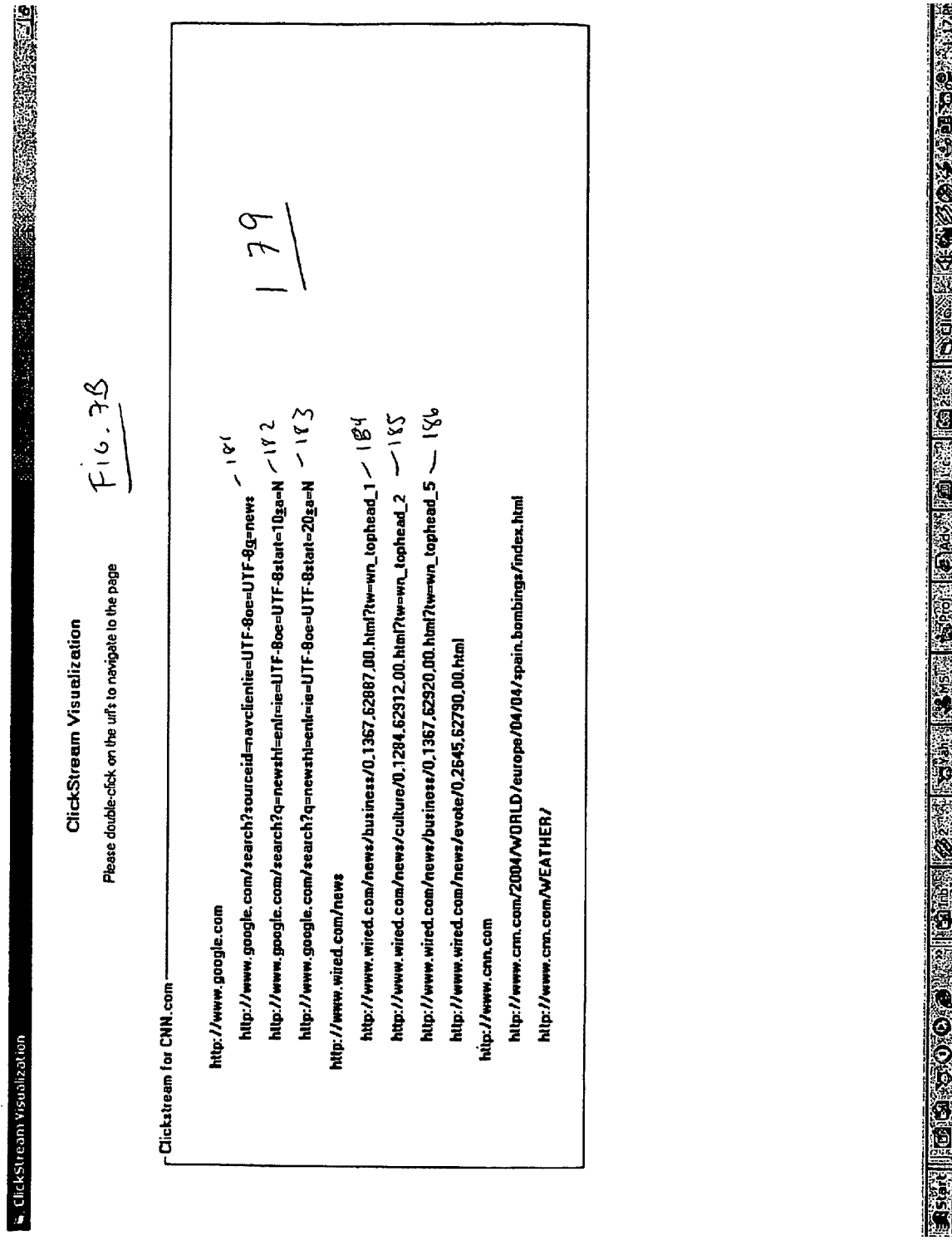

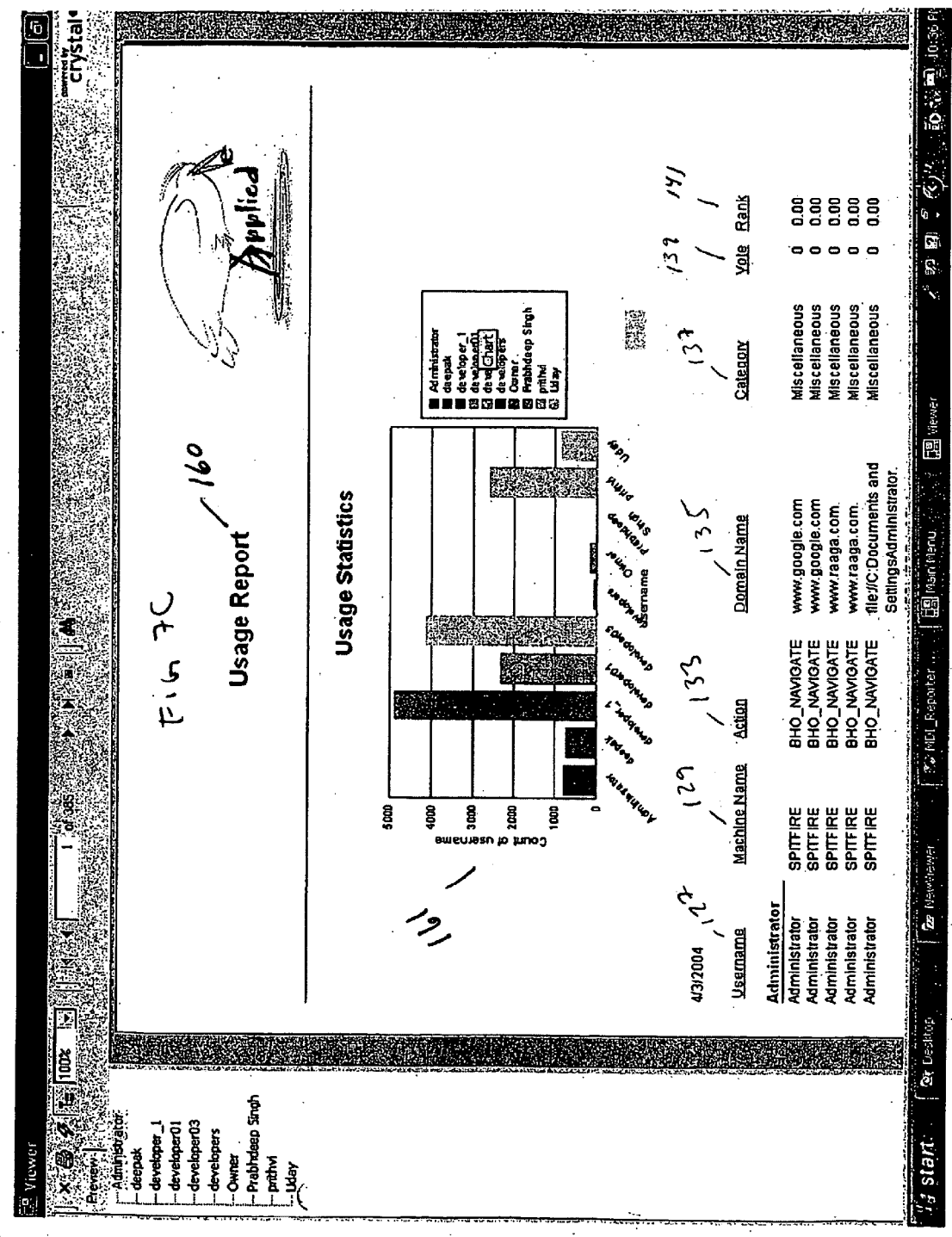

Standalone architecture

KNOWLEDGE ARCHIVAL AND RECOLLECTION SYSTEMS AND METHODS

This application is a divisional application of application Ser. No. 10/818,874 filed Apr. 5, 2004.

The present invention generally relates to data acquisition, analysis, and management system for professionals and organizations of all sizes across many different industries. Specifically system and software with the function of tracking, logging, reporting, archiving, searching, and mining on- and off-line user interactions. The present invention simplifies business and/or academic research activities but also makes it an easy task to build and manage a scalable and secure e-library system. The present invention includes a unique log, report, search, and annotation engines, plus personalization and customization features. The present invention also consists of sophisticated data acquisition, analysis, and management modules hidden behind a simple toolbar embedded in the Web browser on a client computer. The backend of the present invention consists of a scalable database system, which is able to build itself into a hierarchical e-library system. The present invention is envisioned to be scalable from implementation in a small office network of a few client computers to a global corporate network with thousands of users.

While there exists prior art that mainly performs data logging, none address the issues of extracting meaningful insights from the tracking data in a client server environment. The present invention tracks the activities (web and locally) of a user and keeps an audit trail of his actions. The Data Acquisition part consists of plug-ins embedded within the network browser. These components can be programmed to collect system wide data and send the information to a central server in an enterprise setting or store them locally for a standalone deployment. The information collected is extensive in nature and is used as the base for a variety of analytics and reports. The tracking component in the network browser is a lightweight invisible component completely transparent to the user, and it tracks all the user actions in a browser including the navigation and input actions. All the data collected on the client machines is stored in a central database server for post processing and analysis. Partner online can provide complete profiling of the user behavior with different granularity levels.

Advanced Productivity Software, Inc. (APS) develops and markets time tracking and electronic research tracking software for the legal and other professional markets. APS's software tracks time spent on e-mail, tasks, calendar events, etc. and integrates with accounting, time & billing systems and other software applications. Unlike the present invention, APS's software requires manual time-entry by the user and does not provide an audit trail.

Time Matters Software is a leading practice management software provider. Some features of Time Matters include: a Central Timer Control system that enables time tracking of concurrent multiple tasks, SQL reporting, web access tools and multi-office replication and synchronization capabilities to portable devices. Its desktop and web-based software versions are available via a non-ASP model. Time Matters provides an option to link to industry leading programs for billing/expense control, and document automation and management. Time Matters integrates into a practice management software package, and is also sold through Lexis Nexis, a third party legal content provider and data aggregator. Unlike the present invention, Time Matters requires the manual setting of an on-off timer clock and requires the user to create and manually maintain databases of web sites and web references.

PensEra Knowledge Technologies Inc. provides time tracking and knowledge management to the legal profession. PensEra develops Web-based knowledge tools and portal tools, i.e. an online timesheet and central repository of data input, respectively. Its software accommodates a wide range of portable upload and synchronization devices. Unlike The present invention, PensEra's tracking software requires time entries by the user and does not provide an audit trail.

AskSam Systems, Inc. through its SurfSaver software creates a searchable archive of information. The software allows for permanent storage of websites including graphics and hypertext links. The SurfSaver Network version lets multiple users save, search, and view information. In addition, folders can be emailed to other SurfSaver users. SurfSaver lets a research assistant gather on-line research to share with others. Unlike the present invention, SurfSaver does provide an audit trail or track time on the computer. It also can not be integrated into any time and billing/invoicing software packages.

Both Worlds Software, Inc. through its Image Time software mainly addresses the accounting profession. Through the company's Image Time software, a client is provided the ability to eliminate timesheets, monitor productivity and track client receivables; provide timely reports about clients and staff; analyze firm growth, and prepare peer review. Unlike the present invention, Both Worlds Software does not track Internet research.

AimingTech provides software integrated with other windows applications to help users find information online and offline. AimingTech software also allows a user to annotate online and offline content and search these annotated documents. Unlike the present invention the AimingTech software does not provide users with the audit trails of the user activities or have an efficient report generated embedded with the package.

iMarkup Solutions, Inc. provides collaboration and workflow Do solutions for digital content and document management. Their products enable workers to collaborate within and across document content and knowledge management systems. Their tools enable end-users to communicate, annotate, organize and collaborate over the Web as well as providing business users the tools needed to automate and manage their existing business processes. Unlike the present invention iMarkup is not capable of generating customized reports, nor does it provide users with a logical, visual trail depicting how information is retrieved.

Net Snippets is a suite of Personal and Collaborative Information Management Solutions for Internet-based Research. Net Snippets offers a user-friendly platform for personal and collaborative enterprise research, providing users selective information clipping, built in editing tools and an embedded search engine. Net Snippets also creates enterprise research repository and automatically indexes the data both locally and remotely. However, unlike the present invention it does not provide an audit trail of the online or offline user activities.

BillQuick, a time and billing software is used for off-site consultants and satellite offices: time keeping, expense recording, report generation, invoicing, client management and project management via the Web, and time and expense recording on a Palm or Windows CE device. Unlike the present invention, BillQuick does not disclose a web based document archive or web based document modification, and recollection system.

Elite Information Group, Inc. through its subsidiaries including Elite.com and Law Manager, Inc., provides financial & practice management software applications for law firms and other professional service organizations. Elite provides Internet-based time tracking and billing services to smaller professional services companies. Law Manager provides software products including case management, docketing, records management, e-commerce systems and implementation services to law firms, large corporate legal departments and government agencies. Systems include invoice tracking, budgeting, case management and records management. Unlike the present invention, Elite's products do not track, monitor, or capture Internet research activity.

Telemate.Net provides URL filtering tools primarily to help companies manage their employees Internet access and usage. Such as network gateways, switches, and provisioning and billing systems, as well as call accounting and Internet usage management applications. Unlike The present invention, Telemate's products do not have automated time tracking and billing/invoicing capabilities.

Websense Enterprise, provides Employee Internet Management (EIM) software that enable businesses to manage how their employees use the Internet at work. This product gives businesses the ability to implement and configure Internet access policies in support of their efforts to improve employee productivity, conserve network bandwidth and storage space, and mitigate potential legal liability. The Company's software applications operate in conjunction with its proprietary Websense Master Database, which is available for daily incremental downloads.

Westlaw Group provides online legal research services. It enables legal professionals to conduct their research quickly with an extensive collection of legal resources, news, business, and public records information. Additionally, the company's software platform allows them to allocate time and billing services to a client project. Westlaw is mainly a third party content provider and data aggregator. Unlike The present invention, Westlaw's products do not have automated Internet activity tracking, monitoring and capturing features.

U.S. Pat. No. 6,189,024 issued to Bauersfeld et al. discloses a browsing session recording playback and editing system for generating user defined paths and allowing users to mark the importance of items in the paths. The '024 invention automatically records every web page that the user visits. The user can then view all of the paths traversed using a session history toolbar, which incorporates a few control options. The user may also edit the paths, and mark pages on a priority basis. Unlike the present invention, the Bauersfeld et al. invention does not allow the user to query the session history, it merely allows a user to play back and modify the session history.

U.S. Pat. No. 6,052,730 issued to Feliciano et al. discloses a method for monitoring and modifying web browsing sessions. The '730 invention allows for network activity to be recorded by rerouting client HTTP requests through a centralized gateway server, which can record the sequence and timing of URL's accessed by the individuals on the network. The Feliciano et al. invention also allows the user to add content to the network documents and stores the modification on the gateway server. Unlike the present invention, the '730 patent does not allow the user to act on behalf of a multitude of clients tracking Internet activity on a client matter basis.

U.S. Pat. No. 6,625,624 issued to Chen et al. discloses a system and method of archiving web pages and accessing information from a server across a communication network. The '624 invention enables users to retrieve information even after such information has disappeared from the original server. Unlike the present invention the Chen system does not include the ability to monitor on an individual client basis the time spent on the internet, nor does it allow the user to modify the web based documents or provide access to archived data gathered by other users utilizing the archive system.

U.S. Pat. No. 6,647,531 issued to Issac et al. discloses a method of customization of network documents. A user may access a network document, and customize it. The customized document is archived. Upon the user navigating to a network address, the network address is cross-referenced with an archive storing customized network documents. If the network document has been previously customized, the customized document is output to the user. Unlike the present invention the '531 patent does not disclose a method of keeping an audit trail of user interaction, nor does it provide document confidence ranking or knowledge sharing within the network users group.

The present invention enables clients to effectively track, monitor, and capture in-house and outsourced professional services with regard to computer activity and Internet research. The present invention is a web-based application applicable across the entire PSA market. The prior art consisting of software applications designed to capture and bill for time spent, and in some cases time spent on the computer. However, other than the present invention, no prior art appears capable of providing an automated audit trail to validate time spent online, with detail of the websites visited. Much of the prior art's capabilities are limited to generating user-managed time sheets.

Although the prior art perform their respective purposes, what is needed in the industry of time tracking is a system which consists of sophisticated data acquisition, analysis, and management modules hidden behind a simple toolbar embedded in the Network browser on a client computer, and a backend which consists of a scalable database system, which is able to build itself into a hierarchical e-library system and software comprised of unique log, report, search, and annotation engines, plus personalization and customization features.

SUMMARY OF THE INVENTION

The present invention relates generally to systems and computed implemented methods that seamlessly track a users movement and activity on their computer. The user's computer may be a stand alone or over a simple or distributed network.

One embodiment of the present invention is a knowledge archival and recollection system accessible by at least one user. The system comprises a data acquisition module in communication with a database server and a file archive. The data acquisition module includes a network browser plug-in and a toolbar plug-in embedded in a network browser toolbar of the at least one user's computer. The file archive is in communication with the database server, a file archive indexer, and the data acquisition module. A data presentation module is in communication with a report module and a search module. The report module is in communication with the database server, the data presentation module, the search module and the file archive. The search module is in communication with the database server, a file archive indexer, the data presentation module, the report module and the file archive. The file archive indexer is in communication with the file archive, the database server, the report module and the search module. The system gathers user activity data and files accessed by each at least one user through the data acquisition module and archives the user activity data and files on the database server and the file archive for retrieval by each at least one user.

Another embodiment provides a method of recording user activity in a knowledge archival and recollection system. The method comprising a first step of initiating a network browser plug-in on detecting that a network browser has been opened. This is followed by the step of providing at least one file to the user from the network. The next step may be transmitting and storing at least one file to a file archive using a file transfer protocol. User activity data may be gathered for each at least one file accessed. User activity data may be gathered for each related at least one file. Followed by transmitting and storing the user activity data to a database server using a database connection protocol. Followed by the final step of indexing each at least one document.

Yet another embodiment provides a method of extracting knowledge from a knowledge archival and recollection system. This method may comprise the steps of recognizing a user actuation; initiating a search application; displaying a user search interface; receiving input parameters via the search interface; identifying a query type based on the received input parameters; formulating a database query based on the received input parameters; transmitting the database query to a database; obtaining database query results from the database; providing the database query results to a result analyzer module; and displaying search result analyzer module results to a user.

Another embodiment provides a method of extracting knowledge from a knowledge archival and recollection system. The method may comprise the steps of recognizing a user actuation; launching a reporting engine in response to the user actuation; receiving report parameters from a user; formulating a query; configuring a report generator according to the report parameters; transmitting the query to a database server; searching archived reports; loading query results into a report generator; generating a report; and displaying the report on a graphical user interface.

Another embodiment provides a method of extracting knowledge from an enterprise-wide web knowledge recollection and archival system. The method may comprise the steps of recognizing a user actuation; launching a reporting engine; receiving report parameters; formulating a query; configuring a report generator according to the report parameters; transmitting the query to a database server; obtaining query results from the database server according to the query; loading the query results into a report generator; generating a report; and displaying the report on a graphical user interface.

Another embodiment provides a method of timing and recording user activity in a knowledge archival and recollection system. The method comprises the steps of configuring an activity tracking module; logging into said knowledge archival and recollection system; prompting the user with a task identifier input interface upon opening an application user interface; initiating a timer upon input into the input interface; stopping the timer upon inactive application interface; and storing timer data into a database server.

Another embodiment provides a method of billing in an enterprise wide web knowledge archival and recollection system. The method comprising the steps of: recognizing a user actuation; presenting a billing module user interface. Inputting billing parameters; reading supporting data from a configuration file; formulating a query from the billing parameters; transmitting the query to a database server, and obtaining the results from the query; analyzing the results; generating a report using a report generator and presenting the report to a user using a report viewer.

Yet another embodiment discloses a knowledge archival and recollection system accessible by at least one user, the system comprising: a data acquisition module in communication with a database server and a file archive and a database connectivity module. The data acquisition module includes a network browser plug-in and a toolbar plug-in embedded in a network browser of the at least one user's computer. The network browser plug-in transmits data gathered from at least one users network browser to the database server through the database connectivity module. The file archive is in communication with the database server, a file archive indexer, and the data acquisition module. A data presentation module is in communication with a report module and a search module wherein the report module is in communication with the database server, the data presentation module, the search module and the file archive and the database connectivity module. The search module is in communication with the database server, a file archive indexer, the data presentation module, the report module and the file archive and the database connectivity module. The file archive indexer is in communication with the file archive, the database server, the report module and the search module and a timing module in communication with the database server. The timing module records the start time and stop time for an activity within any computer based application. An automatic billing module is in communication with a report module and database server. The automatic billing module generates invoices on user activity. A messenger monitor module is in communication with the database server, and the file archive. The messenger monitor module tracks user activity in a messenger application. A database connectivity module in communication with the data acquisition module, the file archive, the database server, the report module, and the search module, and the automatic billing module, the timing module, the messenger monitor module. The database connectivity module acts as communication gateway to the database server. The system gathers user activity data and files accessed by each the at least one user through the data acquisition module and archives the user activity data and files on the database server and the file archive for the retrieval by each the at least one user.

Another embodiment of the present invention provides a method of recording user activity in a knowledge archival and recollection system, the method comprising the steps of: initiating a network browser plug-in on detecting that a network browser has been opened; providing at least one file to the user from the network; reading a configuration file; creating a file transfer connection from the network browser plug-in to a file archive; establishing communication between the network browser plug-in and a database server; transmitting and storing at least one file to a file archive using a file transfer protocol; gathering user activity data for each the at least one file accessed; associating the user activity data to each related the at least one file; transmitting and storing the user activity data to a database server using a database connection protocol; and indexing each the at least one file.

Another embodiment provides a method of searching in a knowledge archival and recollection system, the method comprising the steps: recognizing a user actuation; initiating a search application; displaying a user search interface; receiving input parameters via the search interface; identifying a query type based on the received input parameters; formulating a keyword query based on the received input parameters; transmitting the keyword query to an indexer; formulating a database query based on the received input parameters; transmitting the database query to a database; obtaining the keyword query results from the indexer; obtaining database query results from the database; determining an intersection of the keyword query results and the database query results; providing the intersection to the post-processing module; generating a rank for each database query result; obtaining a click stream for each database query result; displaying search result analyzer and click stream visualization module results to a user.

These and other features, aspects and advantages of the present invention will become better understood with reference to the following drawings, description and claims.

BRIEF DESCRIPTION OF THE DRAWINGS

FIGS. 7A-7C depict a screen shot of a portion of the system according to one embodiment of the present invention;

DETAILED DESCRIPTION OF THE INVENTION

Figure 1:
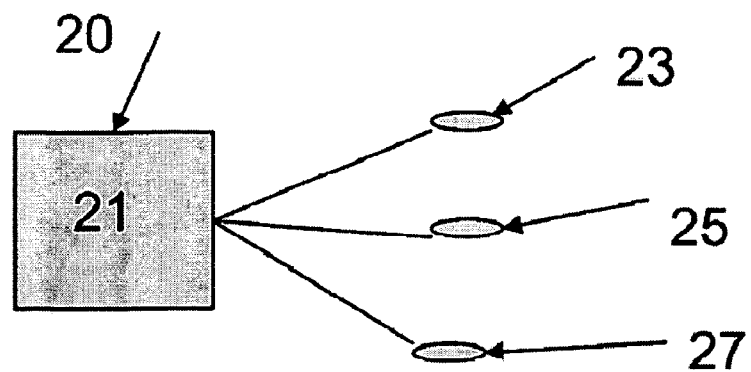
FIG. 1 depicts a single user system architecture according to the present invention.

The present invention, as depicted in FIG. 1, provides a knowledge archival and recollection system 20, for tracking user activity in a client server environment, archiving and managing user knowledge, and extracting meaningful insight from the user activity data and archived knowledge. It is envisioned that the present invention may be particularly valuable in business and academic environments, where collaboration and time tracking of highly detailed nature are particularly important.

The knowledge archival and recollection system 20 has modules intercommunicating to perform a myriad of functions. The vast functionality of the knowledge archival and recollection system 20 stems from three basic functions: (1) data acquisition, (2) data archival, and (3) data recollection. The data acquisition functionality may be both online and offline. Much work throughout all industries and academia is done using a computer in both online and offline settings. For example, a lawyer working on a computer may be working on behalf of a client searching Internet resources and concurrently typing a memorandum in a word processing application running on the local computer operating system. Data acquisition functions include tracking, logging, and file modification and may be both online and offline. Tracking and logging user to activity provides an easy way of automatically auditing time spent by users utilizing a computer system with marginal need for user input. Because all data acquisition functions are designed to operate for both online and offline applications, complete records of all activity in the computer environment may be generated and stored. Intrinsic to the tracking and logging function is the ability of users to modify and personalize the files accessed using their computer system. Given the vast amount of electronic information, it is extremely useful for users to write notes, or modify information on the files accessed. For example, a user may navigate to a file (may include a webpage) on a network, find it relevant to the task at hand and make certain notes and modifications to the file highlighting pertinent information. At a future date the same user may navigate to the same file. The previously made modifications may quickly remind the user exactly why the page was marked with importance. Modification and personalization functions aid users in keeping track of information and knowledge accessed while browsing a network. Paired with a searching function, the modification function allows multiple users researching common subjects to share thoughts on the information accessed. This results in reduced searching times and a collaborative learning environment.

The data archiving function works in conjunction with the tracking, logging, and modifying functionality by recording all the information collected by the data acquisition function. The data archiving function archives files accessed by a user and the respective data gathered by the tracking and logging and modifying functions. The search function aids users in knowledge recollection and information sharing between users. All information recorded by the data acquisition functions is at the disposal of the user, for users may search the archived information according to customizable input parameters. The searching functions effectively reduce the amount of time wasted performing redundant research, which may be especially beneficial to research groups in which multiple users are researching a common topic. The searching function also allows users to retrieve files previously accessed and may also provide a user with a visual depiction of the logical steps taken to arrive at a particular file.

A reporting function works in conjunction with the searching functions and generates customizable activity reports based on user input parameters and information stored on the knowledge archival and recollection system 20.

The present invention consists of sophisticated data acquisition, analysis, and management modules hidden behind a simple toolbar embedded in the network browser on a client computer. The backend of the present invention consists of a scalable database system, which self-propagates to build itself into a hierarchical e-library system. The present invention is envisioned to be scalable from implementation in a small office network of a few client computers to a global corporate network with thousands of users. It should be understood that the number 20 is intended to encompass a number of different systems as in FIGS. 1-3. This is not exhaustive, and is merely intended to depict that it is envisioned that there may be a number of different systems and system architectures in which the present invention may be utilized.

The flexible client server system provides flexibility and scalability to the system. FIG. 1 depicts the knowledge archival and recollection system 20 residing on a single computer 21. In this case, the system 20 is configured to stand alone on a single computer 21 for use by at least one user (e.g. 23, 25, 27) working locally on the computer 21.

Figure 2:
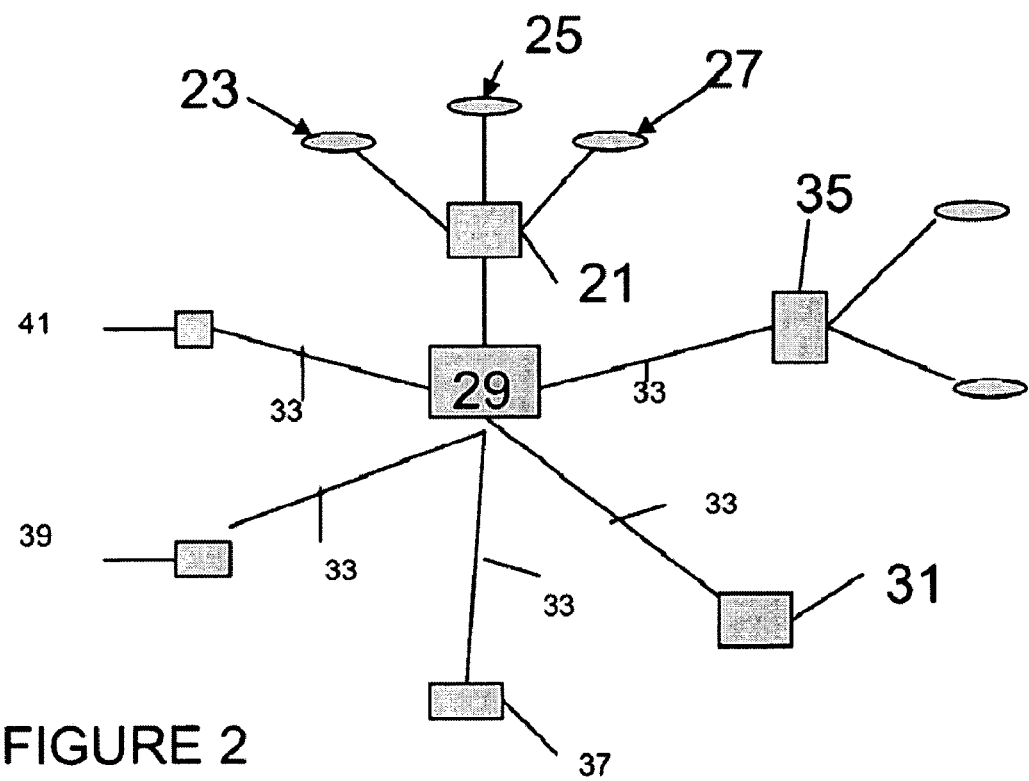
FIG. 2 depicts a multiple user network environment according to the present invention.

FIG. 2 depicts the knowledge archival and recollection system 20 as a distributed system, distributed over a local network 33. This small-scale distributed system 20 consists of at least one central server 29 and at least one computer (e.g. 21, 31, 35, 39, 41) in communication with the central server 29 via a local network 33. One example of this small scale distributed system is a company with one local in-house computer network. In this case employees who are part of the corporations local network may access the knowledge archival and recollection system 20. The present invention facilitates knowledge sharing within the local network.

Figure 3:
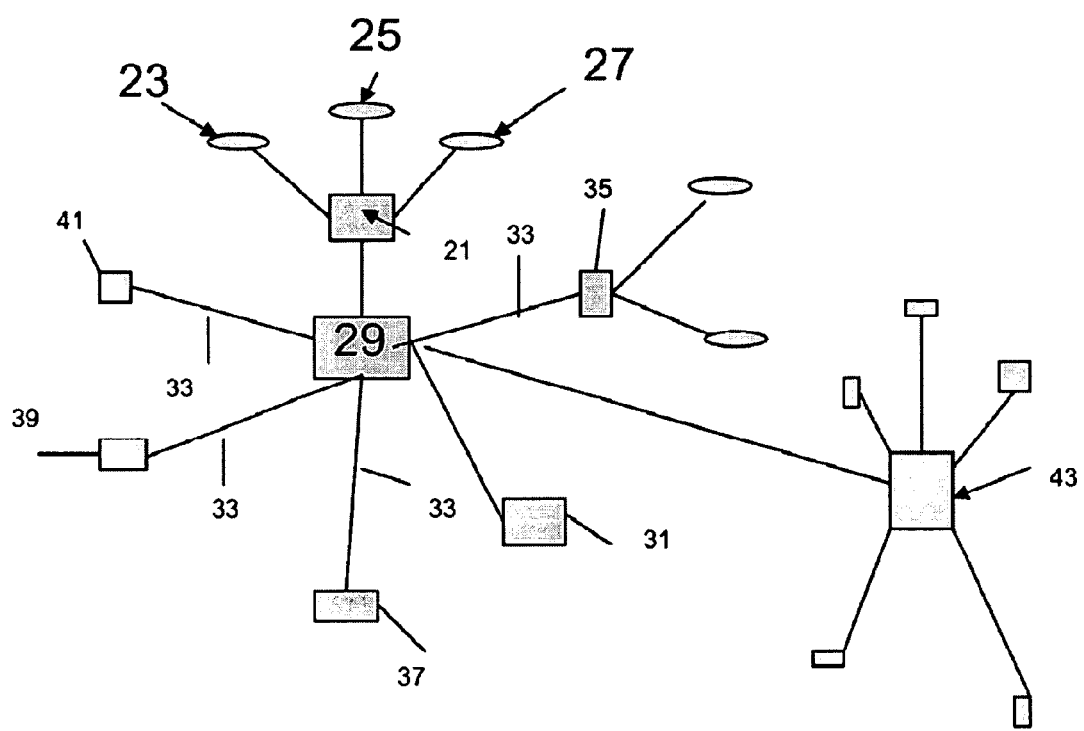
FIG. 3 depicts a multiple user distributed network according to the present invention.

FIG. 3 depicts the knowledge archival and recollection system 20 as a larger scale distributed system. This system 20 may consist of multiple servers (e.g. 29, 41) and multiple intercommunicating networks, which may be in various locations. A multitude of computers (e.g. 21, 35, 31, 37, 39, 41) may be in communication with the servers (e.g. 29, 41) via the intercommunicating local networks. One example of this system configuration is a large corporation with multiple offices in different locations. Aside from auditing tracking and storing user activity, this large-scale distributed network facilitates the sharing of knowledge throughout the entire corporate computer network in multiple locations.

Figure 4:
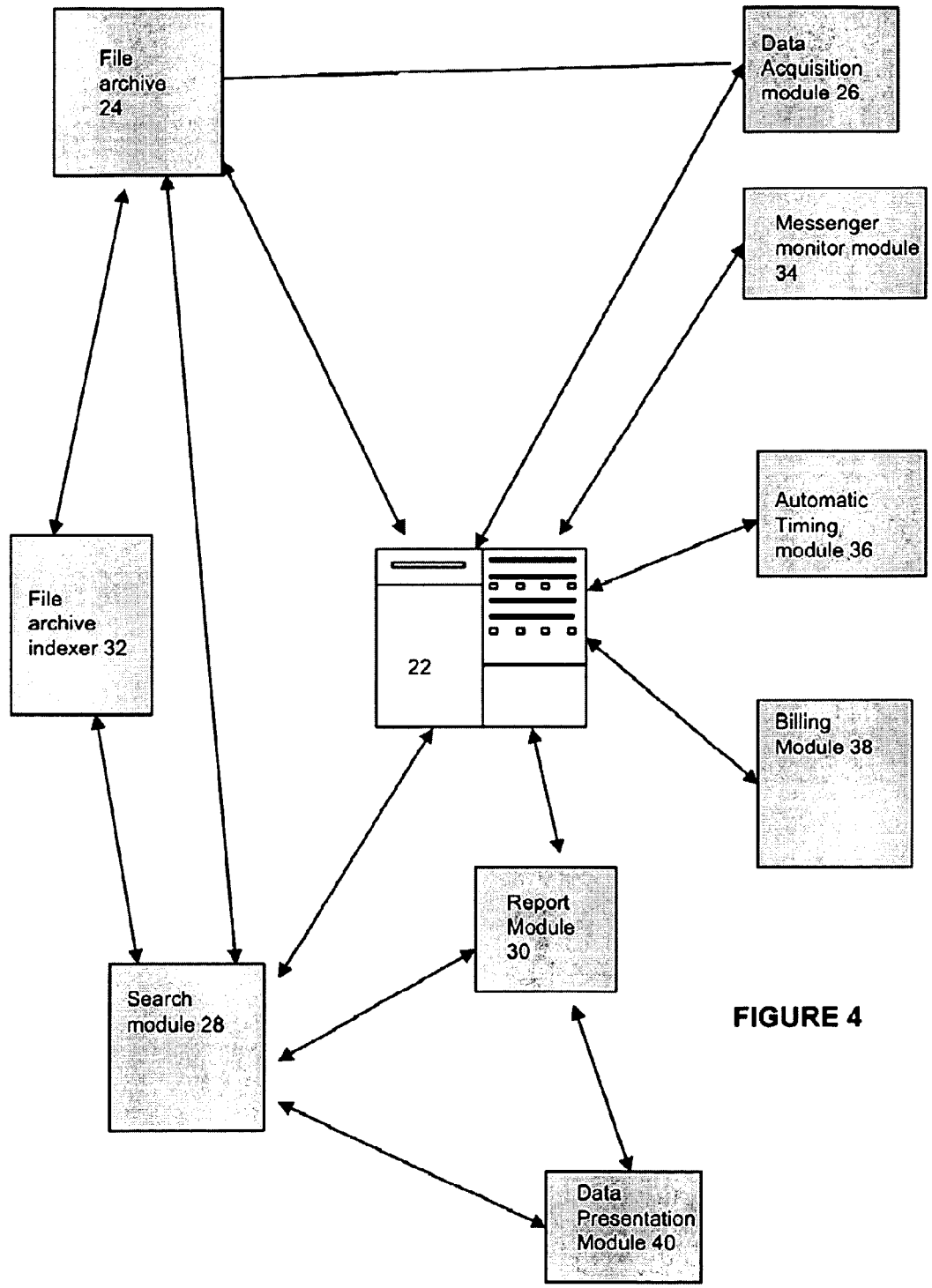
FIG. 4 depicts a portion of the system according to one embodiment of the present invention.

FIG. 4 depicts the main modules of the knowledge archival and recollection system 20 according to the preferred embodiment. The modules may be a data acquisition module 26, a data presentation module 40, a file archive 24, a file archive indexer 32, a database server 22, a search module 28, a report module 30, an automatic timing module 36, a billing module 38, and a messenger monitor module 34. The simple, user-friendly and transparent modules work seamlessly and automatically with a multitude of computer operating systems and network browsers. This may be any of the configurations depicted in FIGS. 1-3 or variations as are well known within the art. Examples of the computer operating systems are LINUX/UNIX based systems, and Microsoft Windows based systems. The network browser may be an intranet browser or an Internet browser such as Windows based Internet Explorer or Netscape Navigator, mozilla, or the UNIX/Linux based Mozilla, Netscape.

The database server 22 may be in communication with a data acquisition module 26, a messenger monitor module 34, an automatic timing module 36, a file archive 24, a search module 28, a report module 30, a billing module 38 (See FIG. 4). The term in communication is intended to mean any means of communication known within the art. This may be, an internet connection or a direct connection. The database server 22 stores user activity data gathered and transmitted by the data acquisition module 26, messenger monitor module 34 and automatic timing module 36. User activity data may be user activity information, system information and environment information. User activity information may be the webpage addresses visited, files visited. System information may be the information regarding your computer such as operating system, ip address, computer name, location. Environment information may information concerning whether your on a network, network location, etc. For the purposes of retrieval of user activity data, the database server 22 is in communication with the search module 28 and report module 30. The database server may also store data transmitted from the billing module 40, search module 28 and report module 30.

The file archive 24 is in communication with the data acquisition module 26, file archive indexer 32 and search module 28. The file archive 24 may also be in communication with the report module 30. The file archive 24 stores the files accessed by the user in the network browser, generating a comprehensive e-library of information. The term file may include, but is not limited to, web-based document, word processing document, spreadsheet document, portable document format, XML file, a text file, a web-based file, a media file, and an audio file. The file archive 24 is an integral component to the knowledge recollection functions of the present invention.

The amount of information on computer networks and the World Wide Web is growing at astronomical rates and can often be overwhelming. A barrage of sources often confronts those performing research on the World Wide Web and can lead to confusion and frustration. For example, an individual may be researching a topic and find a very good and relevant source of information. The individual may want to access the same source at a later date, only to find it no longer in existence. The knowledge archival and recollection system 20 remedies this situation by archiving all files accessed by the user on the file archive 24 effectively building an e-library of information. By storing the files accessed by users on the file archive 24, paired with the activity data stored on the database server 22, the knowledge archival and recollection system 20 may record complete records of user activity. This solves the problem of outdated yet potentially important files being lost.

The data acquisition module 26 maybe in communication with the database server 22 and the file archive 24. The data acquisition module 26 gathers user activity data that may be transmitted and stored on the file archive 24 and the database server 22. The data acquisition module 26 also gathers files accessed by at least one user in a network browser, and transmits the files to the file archive. The functionality of the system revolves around user activity data collection by the data acquisition module 26, the storage of the user activity data on the database server 22, and the storage of the files accessed on the file archive 24.

A file archive indexer 32 is in communication with the file archive 24, with the prime function of indexing the information stored on the file archive 24. As the size of the file archive 24 increases, the time required to search the archive increases as well. To alleviate this problem, the file archive indexer 32 is implemented to generate an index of the contents of the file archive 24. Searching the file archive indexer 32 rather than searching the entire file archive 24 increases the efficiency of the system.

The search module 28 is in communication with the file archive indexer 32, the file archive 24, the database server 22 the report module 30, and the data presentation module 40.

The search module 28 orchestrates the search functions of the knowledge archival and recollection system 20. Searching as performed by the search module 28, allows users to access information stored on the file archive 24 and the database server 22. The search module 28 assembles search parameters input by the user, translates these parameters into search queries, and transmits the search queries to the file archive 24, file archive indexer 32 and database server 22. The search module 28, in conjunction with the data presentation module 40, also displays these query results to the user, received from the file archive 24, file archive indexer 32 and database server 22, to the user.

A report module 30 is in communication with both the database server 22 and the search module 28. Like the search module, the report module is an integral part of the greater knowledge recollection function. The report module 30 and search module 28 perform many of the same functions, such as querying the database server 22, and are therefore in communication. The report module 30 generates activity reports based on user input parameters, and may not only display the report to the user, but also transmit the reports electronically to a mail server.

The system may also have an automatic timing module 36. The automatic timing module 36, records the time duration of user activity for both online and offline computer applications. This time data is transmitted to and stored on the database server 22.

The knowledge archival and recollection system 20 may also have a messenger monitor module 34. The messenger monitor module 34 is in communication with the database server 22, and monitors all user activities in various messenger applications, and transmits the data gathered to the database server 22. This provides for extensive records of all Instant Messaging activities.

Modules in communication with the file archive 24 (e.g. data acquisition module 26, file archive indexer 32, search module 28) communicate with the file archive 24 according to a file transfer connection which may be a network drive map, secure FTP, HTTP, IP-based connection. Modules in communication with the database server 22 (e.g. file archive 24, search module 28, report module 30, billing module 38 automatic timing module 36, messenger monitor module 34, data acquisition module 26 database connectivity module 44) communicate with the database server 22 according to a database connection protocol, which may be ODBC, JDBC, HTTP/PHP.

Figure 5:
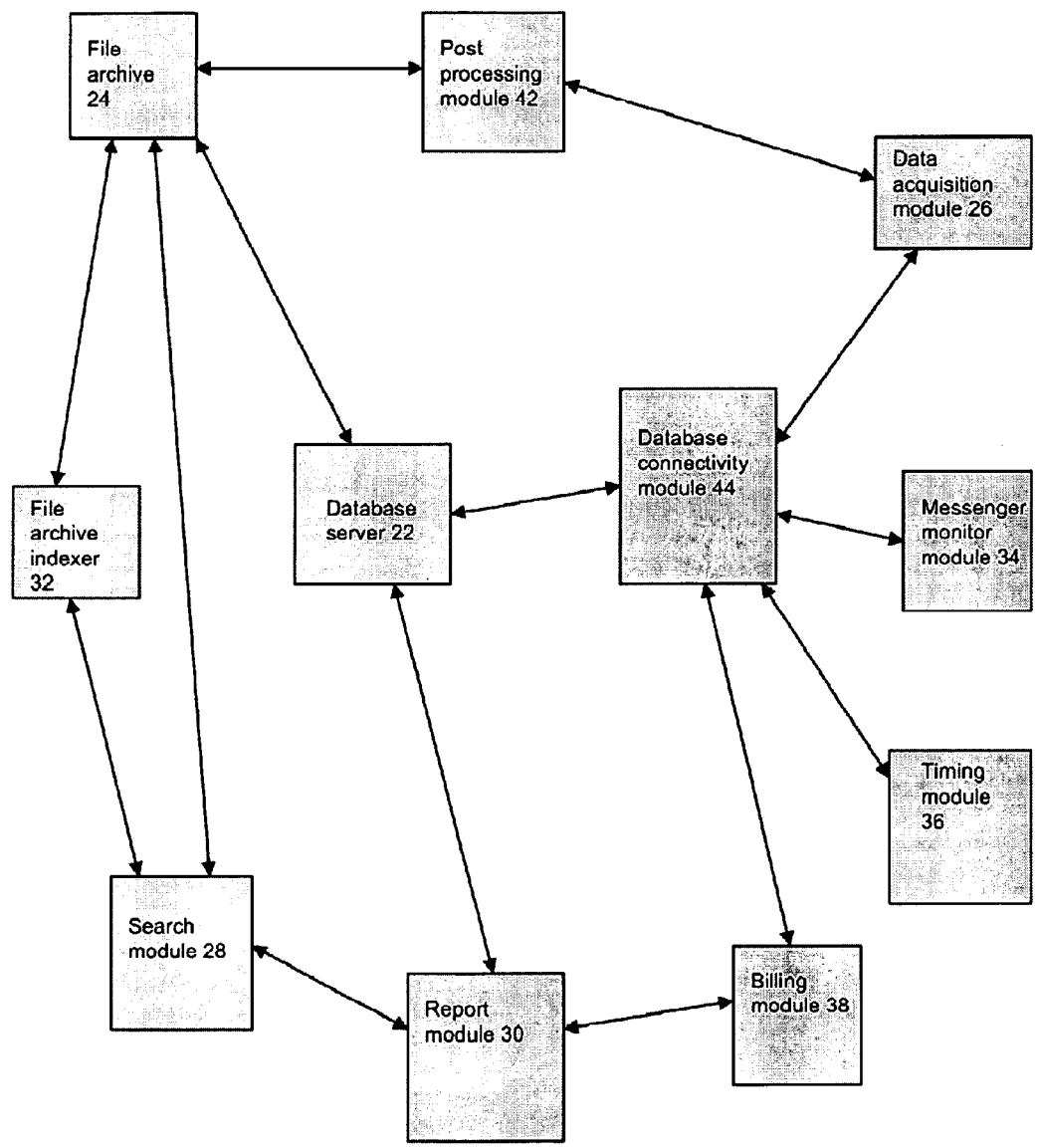
FIG. 5 depicts a portion of the system overview according to another embodiment of the present invention.

FIG. 5 depicts the knowledge archival and recollection system 20 which may also have a database connectivity module 44 and a post-processing module 42. The database connectivity module 44, acts as an intermediary for communication between any module and the database server 22. The database connectivity module 44 may reside on either the user side of the system or the server side of the system and may be in communication with the data acquisition module 26, the database server 22, the report module 30, and the search module 28. The database connectivity module 44 may also be in communication with an automatic timing module 36, a billing module 38 and a messenger monitor module 34.

Figure 6:
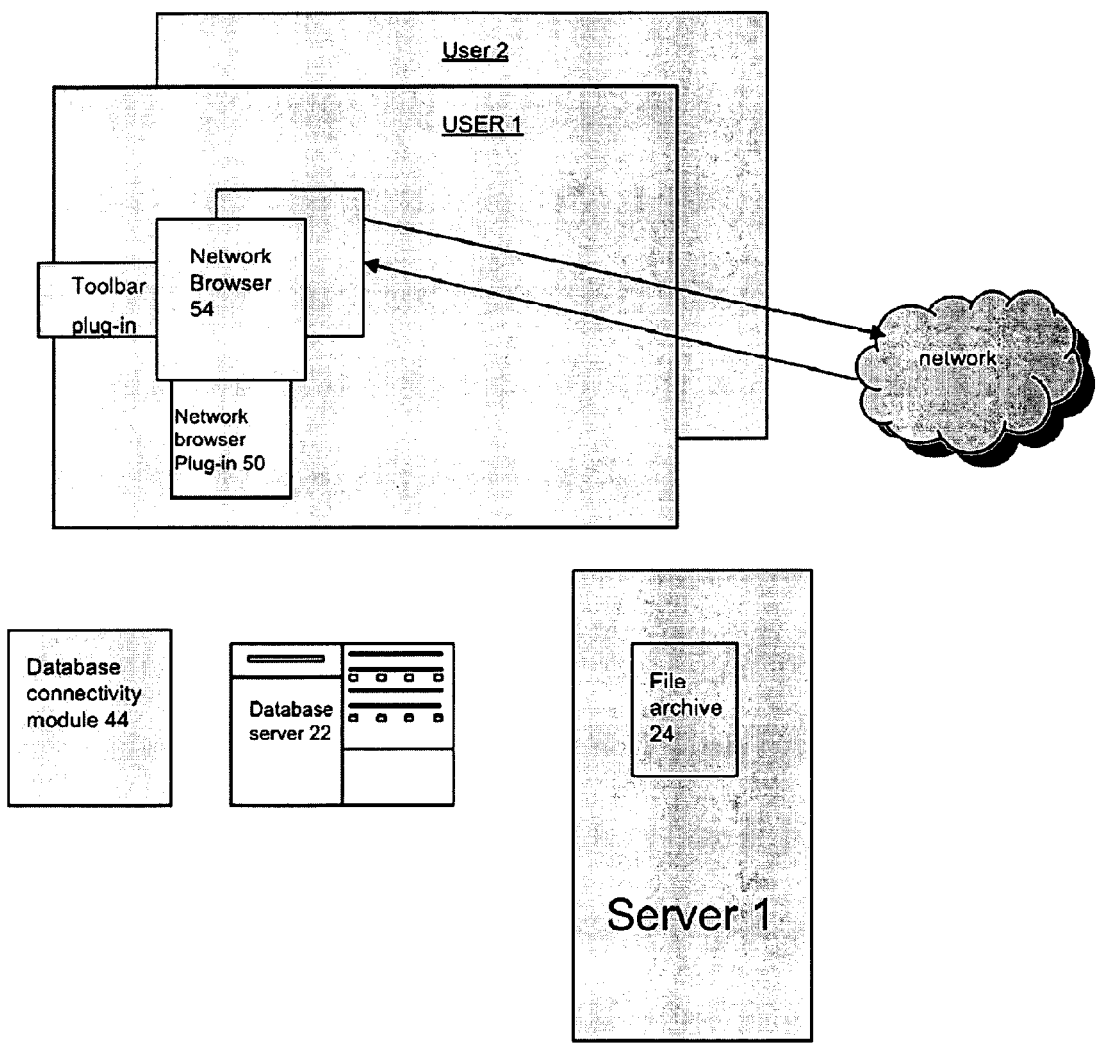
FIG. 6 depicts a portion of the system according to one embodiment of the present invention.

FIG. 6 depicts the data acquisition module 26 according to a preferred embodiment. The data acquisition module 26 may be a standalone program residing on a users computer, or may be an embedded program, embedded in a users network browser 54. The data acquisition module 26 consists of two sub components, the network browser plug-in 50 and the toolbar plug-in 52. The toolbar plug-in 52 component of the data acquisition module 26, may be embedded in the toolbar of the network browser 54. The toolbar plug-in 52 is in communication with the network browser 54, and the database server 22. The toolbar plug-in 52, may also be in communication with a database connectivity module 44.

The network browser plug-in 50 is in communication with the network browser 54, the database server 22, and the file archive 24. The network browser plug-in 50 may also be in communication with a database connectivity module 44. The network browser plug-in 50 may sit on the back of the network browser 54, it may be selected from the group consisting of visible plug-in, invisible plug-in and in built plug-in.

The functionality of the knowledge archival and recollection system 20 revolves around the collection of user activity data. The data acquisition module 26 has multiple functions. One main function is to gather the user activity data and transmit the data to the database server 22. Another function of the data acquisition module is to gather actual content accessed by the user and transmit the files to the file archive 24, as well as provide a platform through which the user can invoke other functions of the knowledge archival and recollection system 20 such as search, report and file modification. Via the data acquisition module 26, users gain access to the knowledge archival and recollection system 20. In gaining access to the system 20, a user may be required to present any given amount of identification information, for example, a user name and password. Users may also have different levels of authority. The authority level assigned to users dictates what level of access the user may have to the system. The authority levels may be designated and controlled by a system administrator.

The network browser plug-in 50 may be programmed to monitor all user activity in the network browser 54, gather user activity data, and send the user activity data to the database server 22 or store the user activity data locally. The information collected is extensive in nature and may be used as the base for a variety of analytics and reports, executed by the search module 28 and report module 30. The user activity data gathered by the network browser plug-in 50 may consist of user activity information, system information and environment information. The network browser plug-in 50 may also send the files accessed by the user in the network browser 54 to the file archive 24. This feature allows the system to build an e-library of content accessed by the user.

The network browser plug-in 50 is able to sit behind any network browser 54 without noticeable computing overhead. Large computing overhead is a problem with many other plug-in programs, as the overhead will slow down the machine as well as take up system resource substantially. The network browser plug-in 50, on the other hand, is taking the minimum system resources and may work seamlessly with all types of network browsers.

The toolbar plug-in 52 may collect file enhancement information and transmit the collected information to the database server 22. File enhancement information may include but is not limited to annotations, highlights, categories, rankings and other file modifications. The present invention facilitates rapid customization of data by giving the user the power to highlight the sub-parts or the relevant parts of the files accessed in the network browser.

Figure 7A:
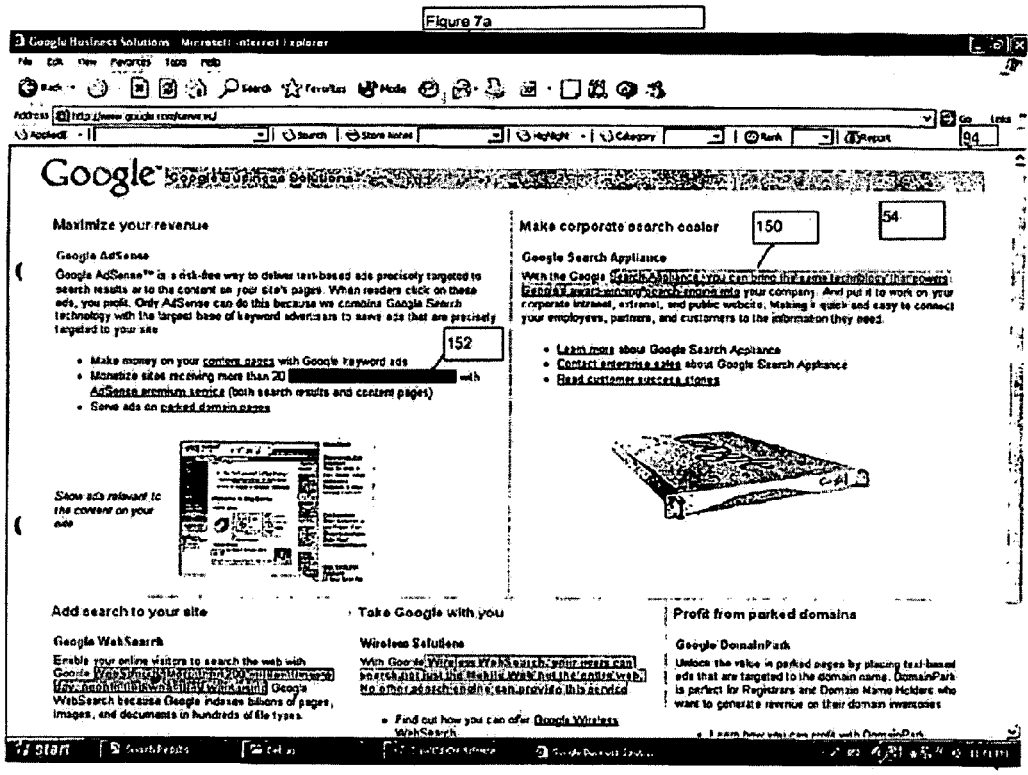

FIG. 7A depicts a screen shot of the network browser 54 when a user is personalizing data. Users are given the option for personalization of data by being able to put in their own notes and summaries for the web data. Users may also insert, or associate other files 152 with certain network browser files. These portions can be retrieved, exported or simply be reproduced as annotations next time the content is accessed, this kind of tagging of online content along with the highlighting 150 can be shared among multiple users if the system is deployed in an enterprise configuration. Although, it is not viewable, there may be comments that when a mouse is over a highlighted portion (such as 150) they may be viewable. For instance, someone may right their thoughts on that portion and the next person to view the webpage would then see these comments. The network browser toolbar 94, the visible component to the toolbar plug-in 52, acts like a control panel for all the key functions of the knowledge archival and recollection system 20. Various modules and their respective functions of the knowledge archival and recollection system 20, such as the reporting module 30, searching module 28, billing module 38, automatic timing module 36, may be invoked through the network browser toolbar 94. This consolidation of control to one network browser toolbar 94 is user-friendly and requires a brief and simple learning process. It is highly structured to give user the maximum usage of the product. It also provides the interfaces for users to access other modules of the product.

FIG. 7B depicts a screenshot 179 of a click stream for cnn.com. As shown, the url for each webpage is (e.g. 181, 182, 183, 184, 185, 186) to track the users movement. FIG. 7C depicts a usage report 160, showing a graphical depiction of a count of username 161 for each username 172. There is also a chart with the machine name 129, action 133, domain name 135, category 137, vote 139 and rank 140 for each username 127.

Figure 8:
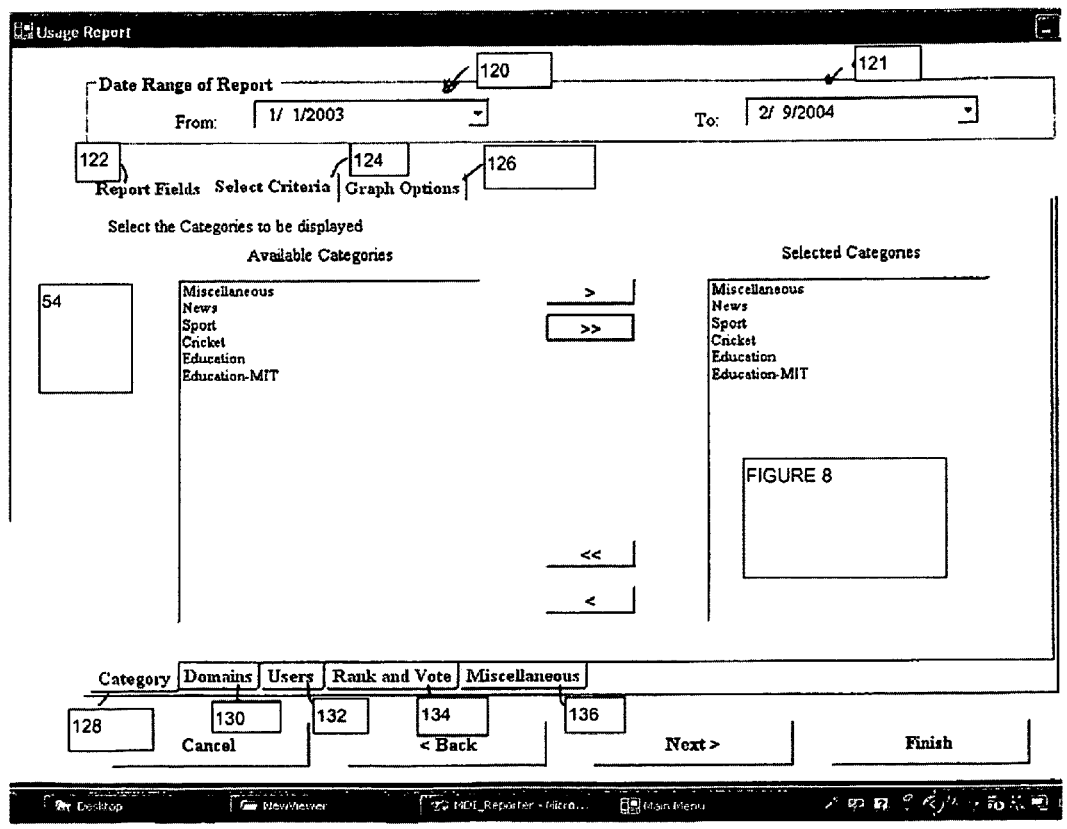
FIG. 8 depicts a screen shot of a portion of the system according to one embodiment of the present invention.

FIG. 8 depicts a screen shot of an application in the knowledge archival and recollection system. Employing an actuation method, a user may invoke an application of the knowledge archival and recollection system 20 in the case of the data acquisition module 26 being an embedded application of the network browser 54, the actuation method may be "mouse clicking" the field of the desired application on the network browser toolbar 94. As shown, a date range (from 120 to 121) may be selected. The report fields 122, select criteria 124 and graph options 126 may each be altered according to the user. Within the select criteria 124, the user may view category 128, domain 130, users 132, rank and vote 134 and other miscellaneous 136 items.

Figure 9:
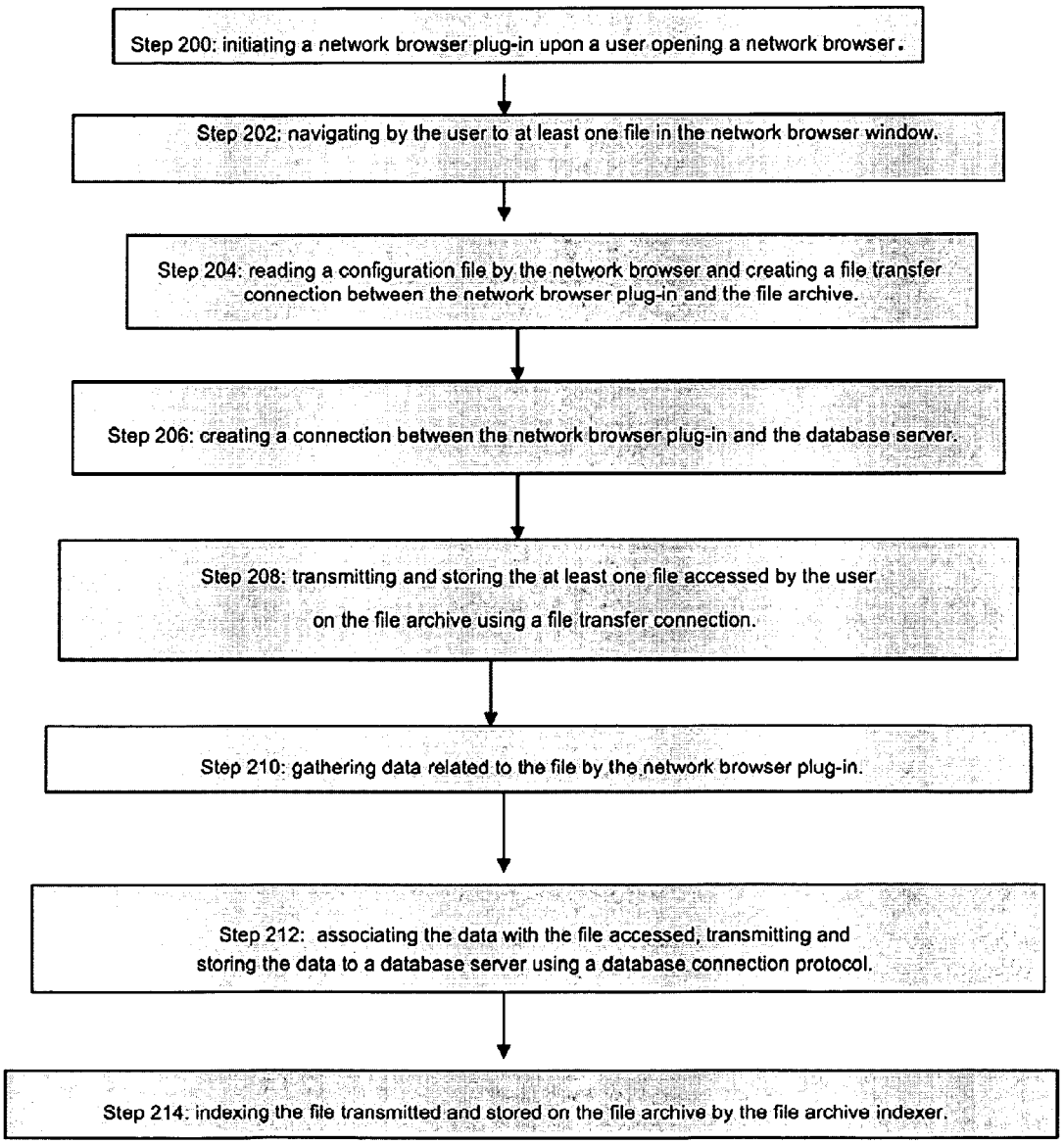
FIG. 9 depicts a method according to one embodiment of the present invention.

FIG. 9 depicts a method of initiating and utilizing the data acquisition module 26 according to the present invention. The method may include; (step 200) initiating a network browser plug-in 50 upon a user opening a network browser 54; (step 202) navigating by the user to at least one file in the network browser 54; (step 204) reading a configuration file by the network browser plug-in 50 and creating a file transfer connection between the network browser plug-in 50 and the file archive 24; and (step 206) creating a connection between the network browser plug-in 50 and the database server 22. The network browser plug-in 50 may be in communication with the file archive 24 and the database server 22 by way of a database connectivity module 44. The next step (step 208) may be transmitting and storing at least one file accessed by the user on the file archive 24 using a file transfer connection. The file accessed may be but is not limited to web-based document, word processing document, spreadsheet document, portable document format, XML file, a text file, a web-based file, a media file, and an audio file. The next step (step 210) may be gathering data related to the file by the network browser plug-in 50. The data gathered may be user activity information, system information and environment information. Next (step 212) may be associating the data with the file accessed, transmitting and storing the data to a database server 22 using a database connection protocol. Step 214 may be indexing the file transmitted and stored on the file archive 24 by the file archive indexer 32.

Figure 10:
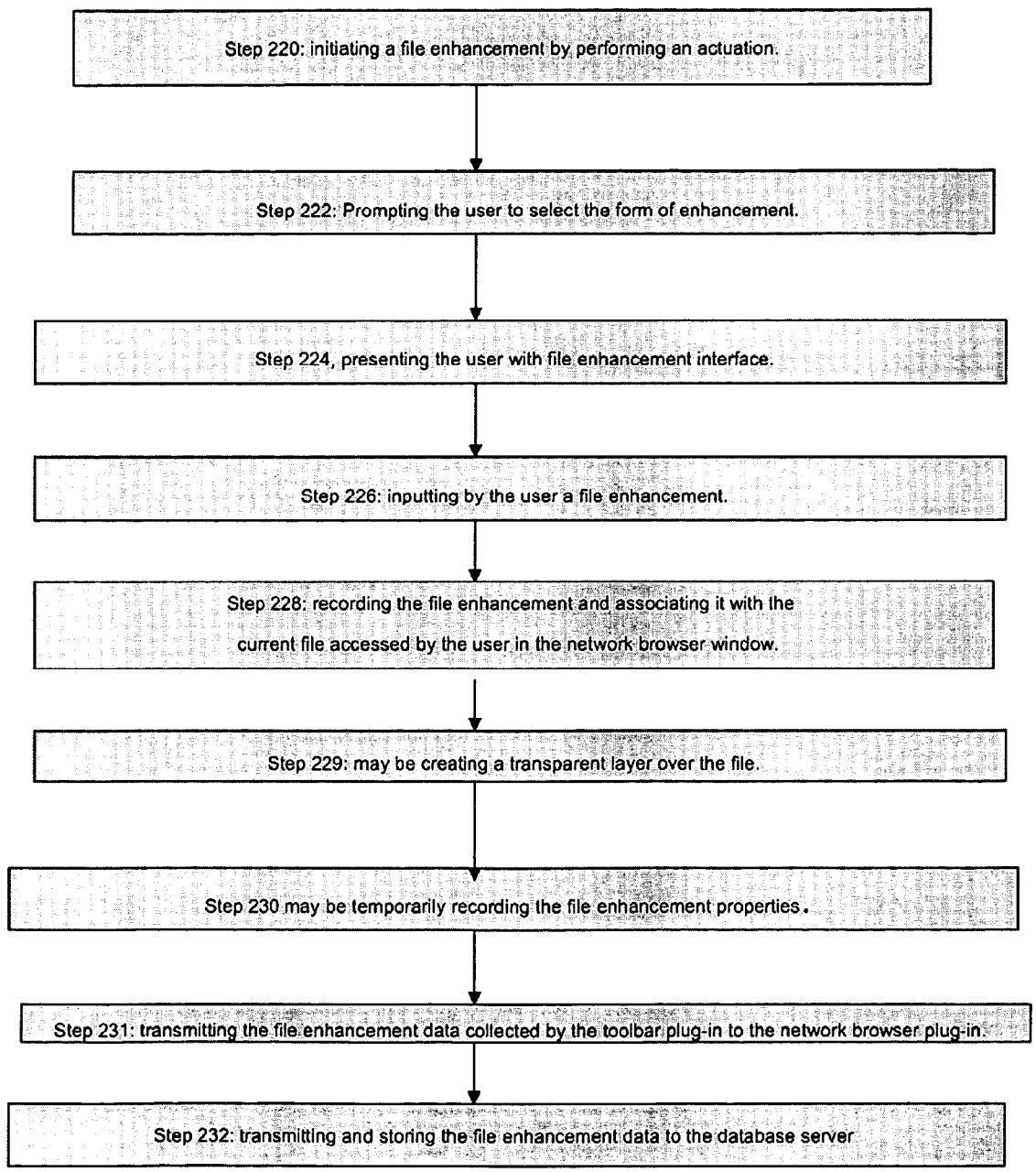
FIG. 10 depicts a method according to one embodiment of the present invention.

FIG. 10 depicts a method of enhancing files accessed in the network browser 54. The method may include the steps, Step 220: initiating a file enhancement by performing an actuation. The actuation may be actuating an icon in the toolbar of the network browser 54, an icon in the system tray, and icon in a free-floating toolbar. The actuation may also hot key activation or context menu selection. Step 222: Prompting the user to select the form of enhancement. The form of enhancement may be but is not limited to highlighting, note addition, annotation, comment addition, footnote appending, endnote appending, and file insertion. Step 224, presenting the user with file enhancement interface. Step 226: inputting by the user a file enhancement. Step 228: recording the file enhancement and associating it with the current file accessed by the user in the network browser 54. Step 229: may be creating a transparent layer over the file. Step 230 may be temporarily recording the file enhancement properties. Step 231: transmitting the file enhancement data collected by the toolbar plug-in 52 to the network browser plug-in 50. Step 232: transmitting and storing the file enhancement data to the database server 22. The file enhancements may be toggled between visible and invisible with respect to a user display. The user and/or system administrator may also control access to the file enhancements by any of a number of users.

Figure 11:
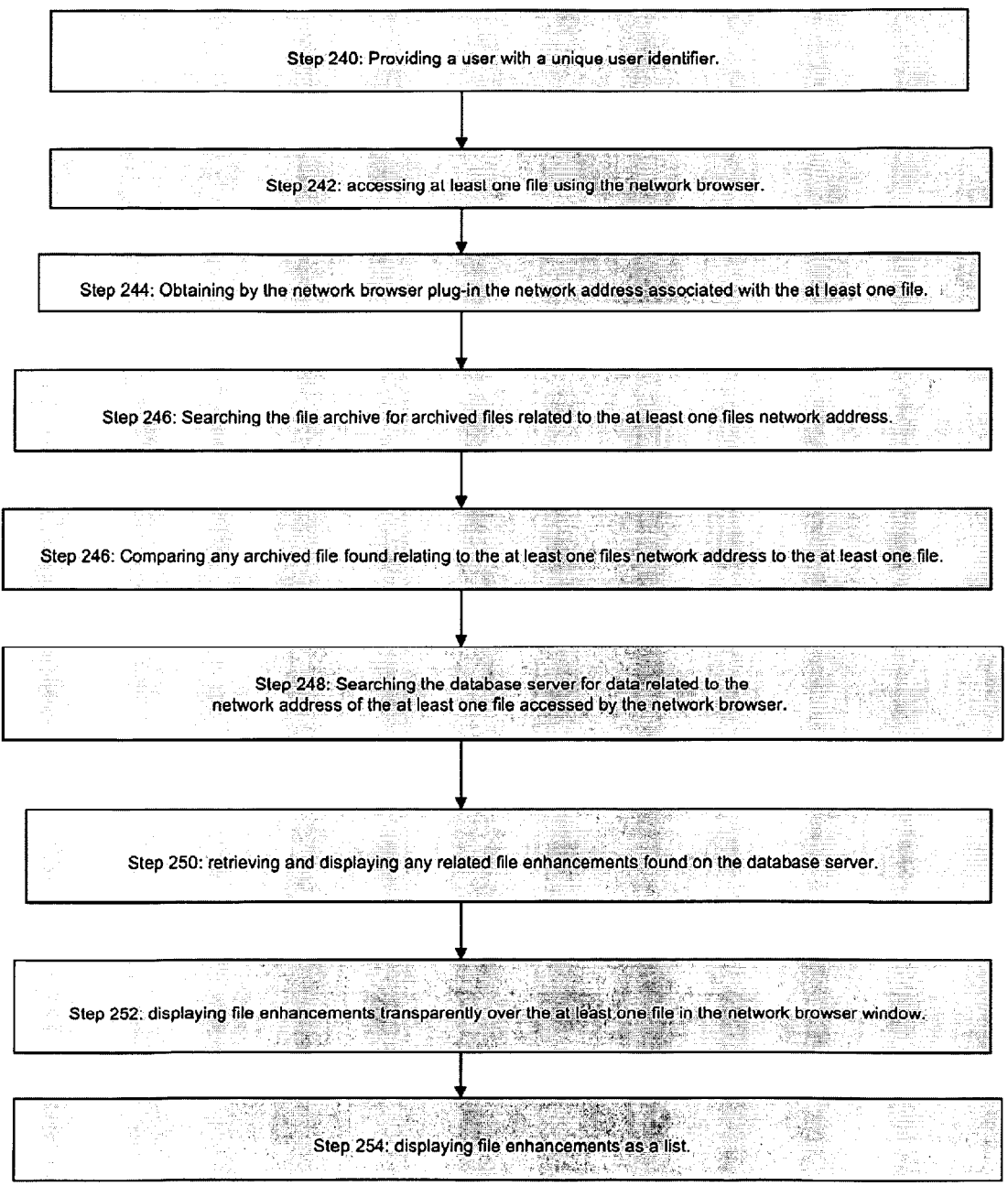
FIG. 11 depicts a method according to one embodiment of the present invention.

FIG. 11 depicts a method of displaying file enhancements previously recorded. The method may include the steps of Step 240: Providing a user with a unique user identifier. Step 242: accessing at least one file using the network browser 50. Step 244: Obtaining by the network browser plug-in 50 the network address associated with the at least one file. Step 246: Searching the file archive 24 for archived files related to the at least one files network address. Step 246: Comparing any archived file found relating to the at least one files network address to the at least one file. Step 248: Searching the database server 22 for data related to the network address of the at least one file accessed by the network browser. Related data may be file enhancements, such as but not limited to comments, highlights, and rankings. Step 250 retrieving and displaying any related file enhancements found on the database server 22. Step 252 displaying file enhancements transparently over the at least one file in the network browser window. Step 254: displaying file enhancements (maybe as a list).

Figure 12:
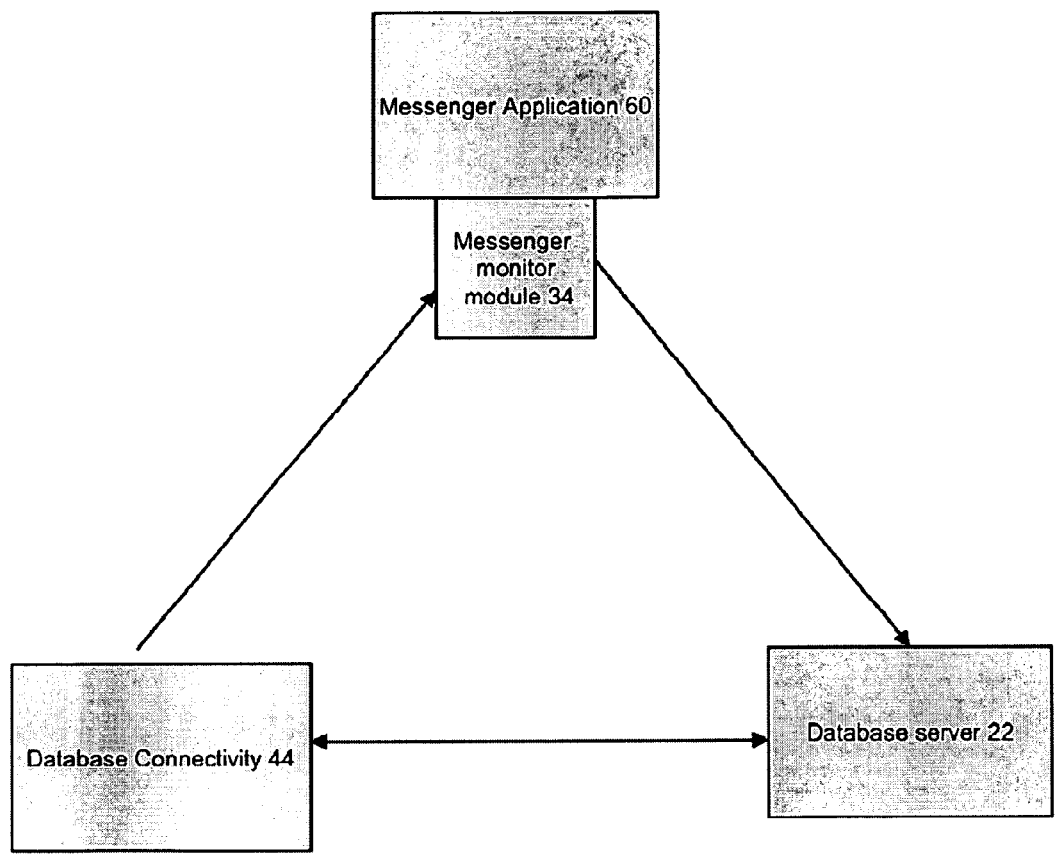
FIG. 12 depicts a portion of the system according to one embodiment of the present invention.

FIG. 12 depicts the messenger monitoring module 34 according to a preferred embodiment. Messaging is an important and widely used channel of communication in both personal and business capacities. Monitoring data exchanged via messenger programs is important to individuals or businesses that wish to keep record of all forms of electronic communication or merely observe users messenger activities. The knowledge archival and recollection system 20 may have a messenger monitor module 34 for the function of auditing and recording user activity in a messenger application 60. The messenger monitor module may be in communication with a messenger application 60 and the database server 22. The messenger monitor module 34 may also be in communication with a database connectivity module 44. The messenger application 60 may be but is not limited to AOL Instant Messenger, ICQ, Windows Messaging, or other similar chatting programs. The messenger monitor module 34 may be a stand-alone program residing on a users computer, or may be a plug-in embedded in a users messenger application 60. The messenger monitor module 34 may sit on the back of the messenger application 60 and may be visible or invisible to the user. The messenger monitor module 34 may be selected from the group consisting of visible plug-in, invisible plug-in and in built plug-in. The messenger monitor module 34 may be programmed to collect user activity data, which may be user activity information, system information, and environment information, and transmit the information to the database server 22 or store the information locally. The user activity data collected is extensive in nature and may be used as the base for a variety of analytics and reports executed by the search module 28 and the report module 30.

Figure 13:
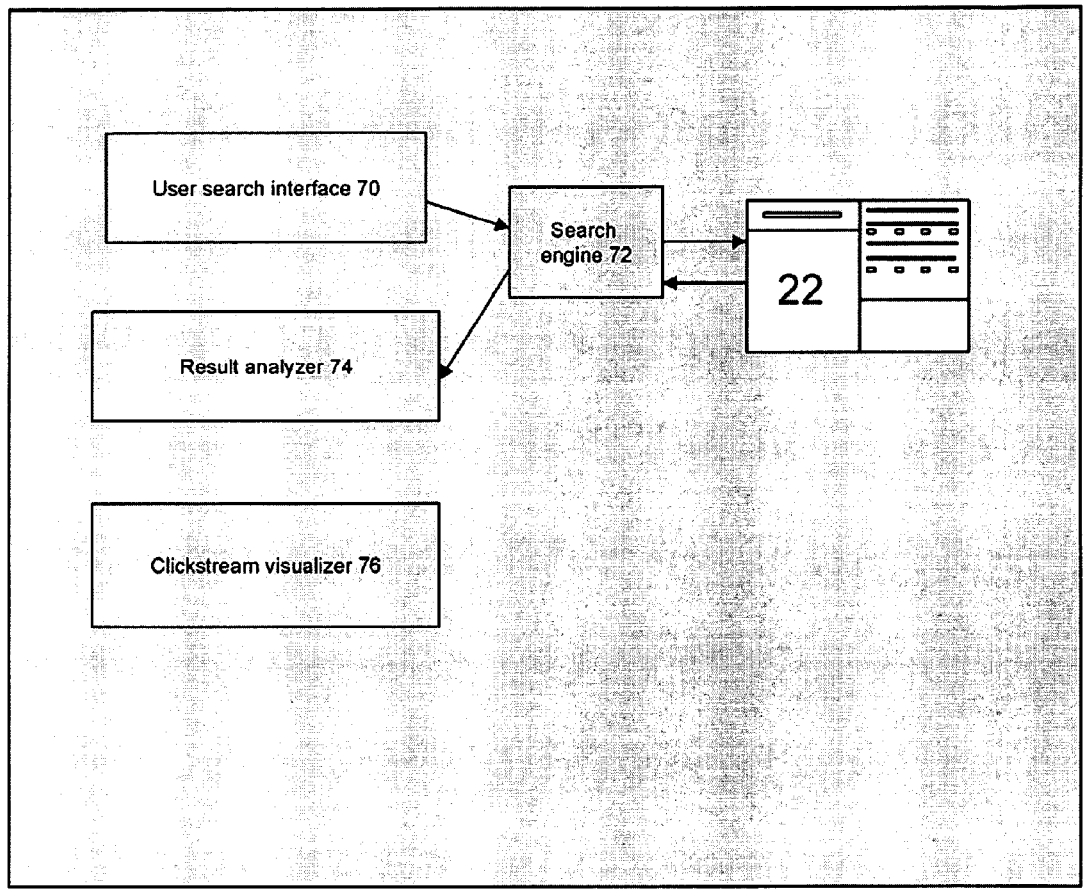
FIG. 13 depicts a portion of the system according to one embodiment of the present invention.

FIG. 13 depicts the search module according to the present embodiment. The search module 28 is comprised of a user search interface 70, a search engine 72, a result analyzer 74, and a click-stream visualization module 76. The search module 28 may be a standalone module residing on the users computer, or may reside on the server side of the system. The user search interface 70 is in communication with the search engine 72, the search engine is in communication with the database server 22, the file archive 24 and the file archive indexer 32. The result analyzer 74 and click-stream visualization module 76 are in communication with the database server 22, file archive 24 and the file archive indexer 32, and the user search interface 70. The user search interface 70 may be embedded in the user's network browser window, may be a web based interface or a standalone module on the users computer.

The search module 28 of the knowledge archival and recollection system 20 provides multi parameter search facilities for the retrieval of user activity data stored on the database server, or files stored on the file archive. The search module 28 provides the user with a variety of search options and result visualization options.

Users may invoke the user search interface 70 by an actuation method. The actuation method may be actuating an icon located in the network browser toolbar, or an icon in the system tray of the operating system. In the case of the user search interface 70 being a web-based interface, it may be invoked either through the toolbar of the network browser or by accessing a specific web address. When a user is presented with the user search interface 70, the user may input parameters according to which the user would like to search the knowledge archival and recollection system 20. The types of input parameters may be customized to the specific needs of the user. The input parameters will essentially pertain to the user activity data stored on the database server 22 or the content of files stored on the file archive 24. Examples of input parameters for the search user interface 70 are keyword, time, user information, system information and client information. The user search interface 70 may transmit the input parameters entered by the user to the search engine 72. The search engine 72 is programmed to convert the parameters transmitted from the user search interface 70 into a search query. The search engine 72 may transmit the search query to the database server 22, file archive indexer 32 and the file archive 24.

Results from the query initiated by the search engine 72 are transmitted to the result analyzer 74 and the click stream visualization module 76. The result analyzer and the click stream visualization module process these query results, and transmit the processed results to the user search interface. Process functions executed by the result analyzer 74 may be dynamic, such as ranking and categorization. The click stream visualization module 76 generates a visual depiction of the logical actions taken by a user while browsing in the network browser. Click streams may also be searchable so that multiple users working on similar subjects may access relevant click streams from previous researchers. Processed results are transmitted to the user search interface 70 from the result analyzer 74 and the click stream visualization module 76 and are displayed to the user.

Figure 14:
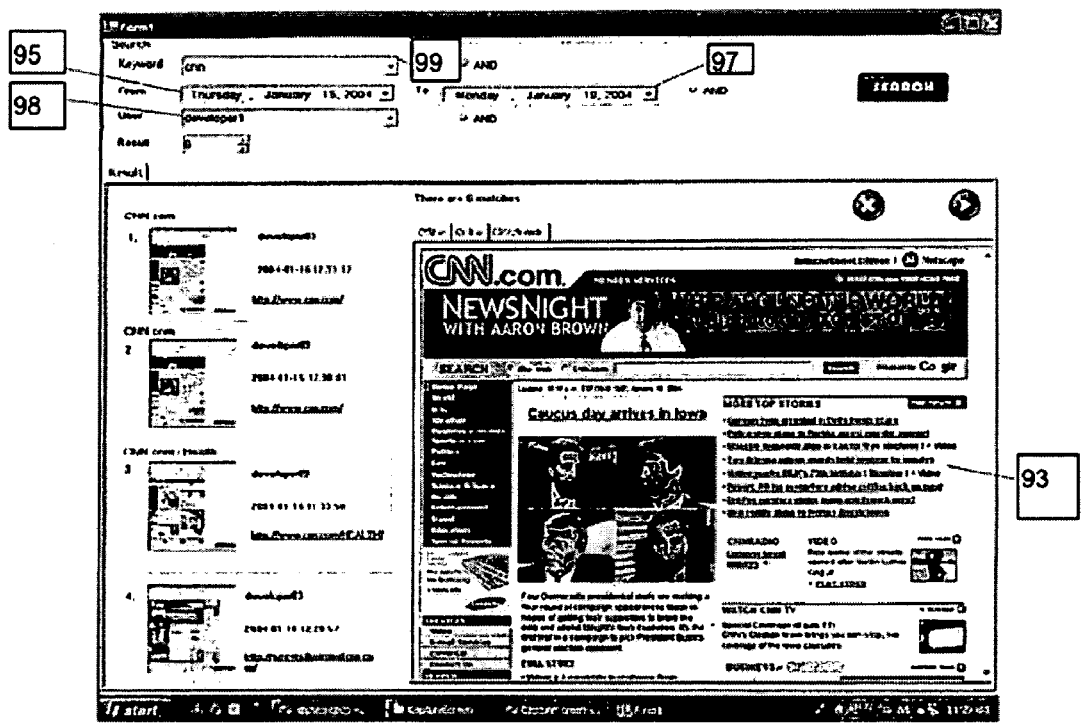
FIG. 14 depicts a screen shot of a portion of the system according to one embodiment of the present invention.

FIG. 14 depicts a screen shot 93 of an example search according to the preferred embodiment. In this example search may be for a user to input parameters for files accessed from Jan. 15, 2004 (input field 95) to Jan. 19, 2000 (input field 97), by user (98) developer 1, with a keyword 99 of CNN. The user may input the search parameters in the appropriate fields of the user search interface. Given this is a valid search for which stored information exists on the knowledge archival and recollection system 20, the user will be presented with appropriate files, and respective user activity information that match the search parameters. For each resulting file, the user may be presented with the file as archived, user information associated with the file as archived, the online file associated with the file as archived, as well as the click stream. The click stream is a visual depiction of the browsing steps taken by the user to reach the respective file. The resulting files may depicted as thumb nail images, as well as full size images, not merely textual information. Click stream elements may also be shown as visual indicators such as web page thumbnails, not merely just textual information.

Figure 15:
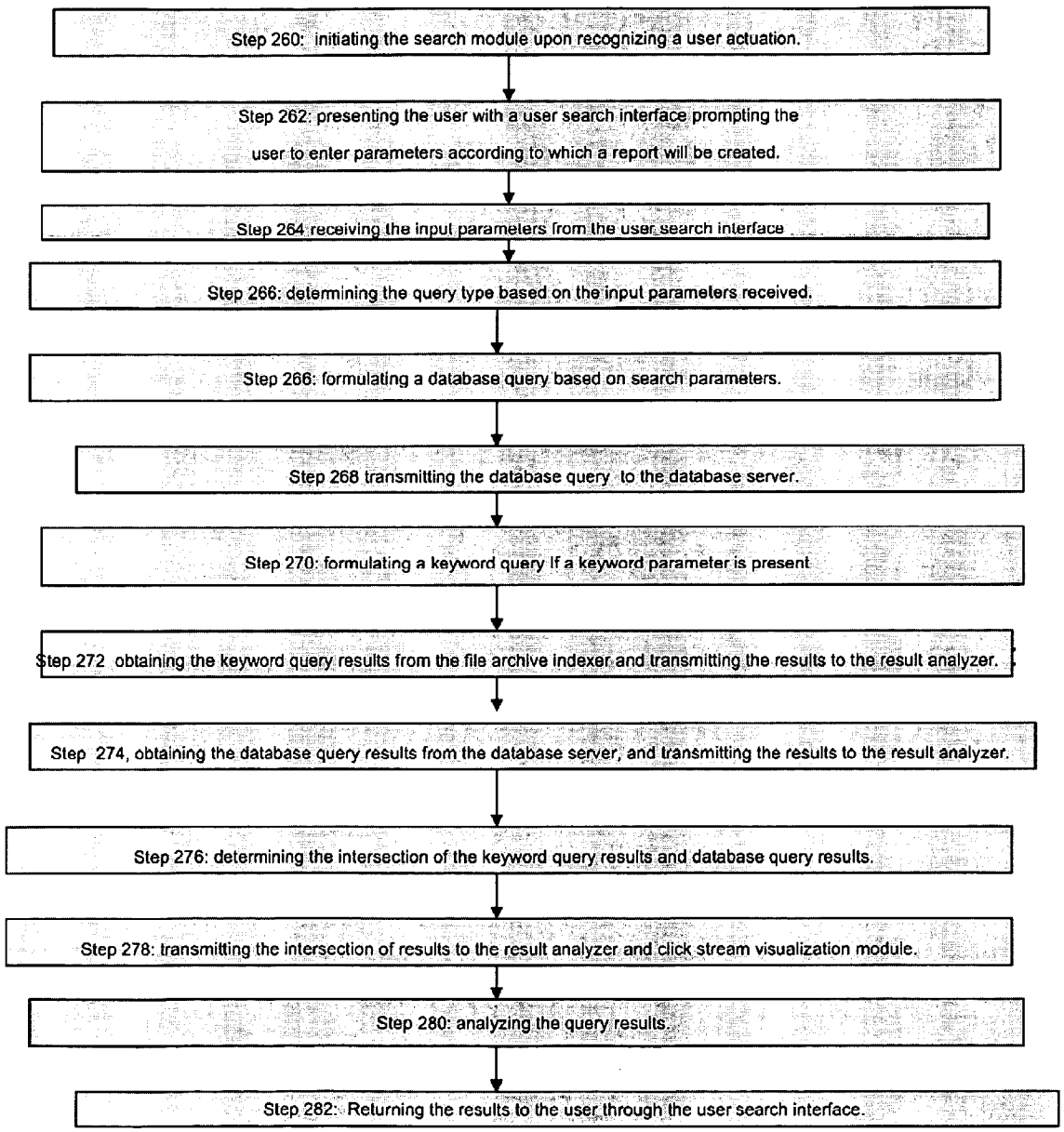
FIG. 15 depicts a method of implementation according to one embodiment of the present invention.

FIG. 15 depicts a method of initiating and performing a search according to the preferred embodiment. Step 260: initiating the search module 28 upon recognizing a user actuation. The user may actuate an icon in the network browser window, the system tray, a hot key activation, or a context menu selection. The user may also initiate the search module 28 by starting a standalone program on the users computer or accessing a specific web address. Step 262: presenting the user with a user search interface prompting the user to enter parameters according to which a report will be created. The parameters may be related to user activity, system information, file content, environment information and file enhancement. Step 264 receiving the input parameters from the user search interface. Step 266: determining the query type based on the input parameters received. Step 266: formulating a database query based on search parameters. Step 268 transmitting the database query to the database server 22. Step 270: formulating a keyword query If a keyword parameter is present Step 272: obtaining the keyword query results from the file archive indexer 32 and transmitting the results to the result analyzer. Step 274, obtaining the database query results from the database server, and transmitting the results to the result analyzer. Step 276: determining the intersection of the keyword query results and database query results. Step 278: transmitting the intersection of results to the result analyzer and click stream visualization module. Step 280: analyzing the query results. Step 282: Returning the results to the user through the user search interface. The results may be displayed as thumbnails, visual depiction of the click stream, archived web-pages, actual online content and file enhancements. Step 284: transmitting the database query results, keyword query results, and the input parameters to the report module 30, and generating a report.

Figure 16:
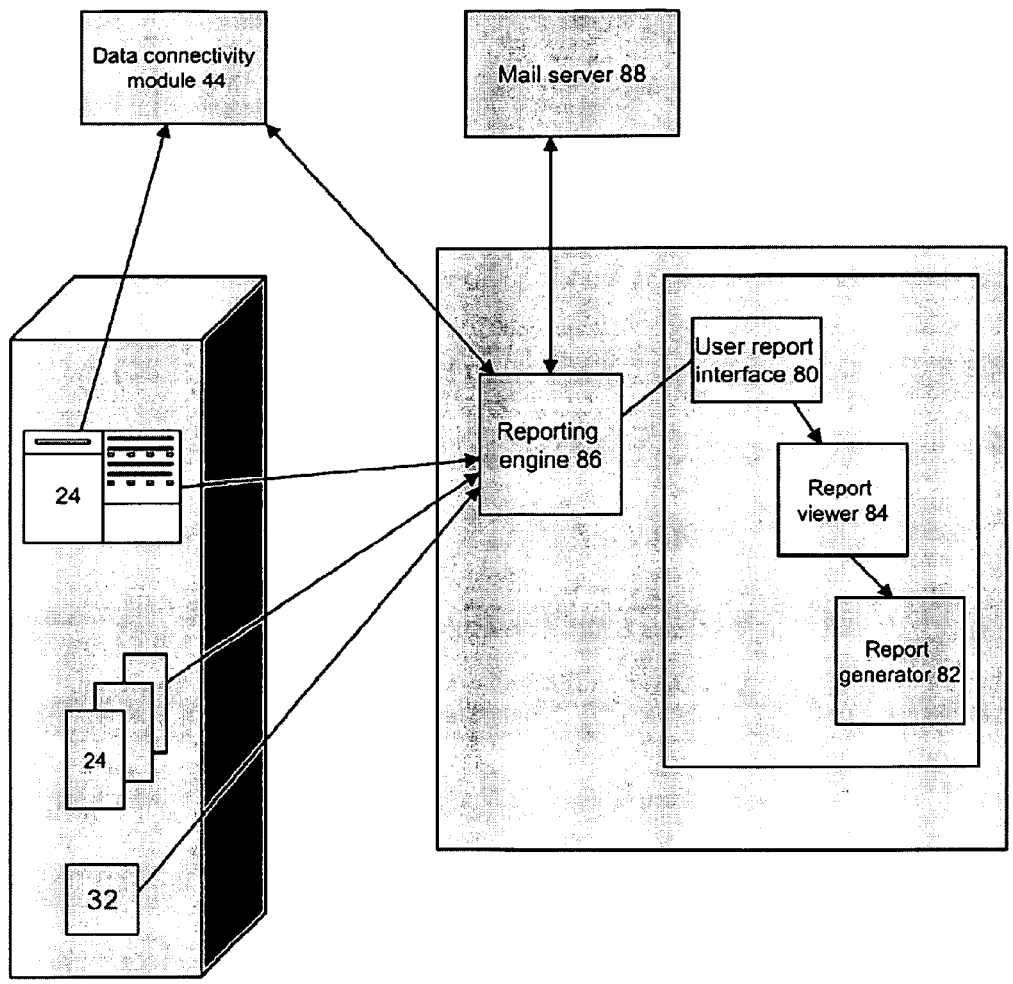
FIG. 16 depicts a portion of the system according to one embodiment of the present invention.

FIG. 16 depicts the report module according to the present embodiment. The report module 30 may be in communication the database server 22, the search module 28, and the billing module 30. The report module may also be in communication with the file archive 24, and the file archive indexer 32 and a mail server 88. The report module 30 may be a standalone module residing on the users computer, or may reside on the server side of the system.

The report module 30 is comprised of a user report interface 80, a report engine 86, a report generator 82, and a report viewer 84. The user report interface 80 is in communication with the report engine 86, and the report viewer 84. The user report interface 84 may be embedded in a user's network browser window, may be a web based interface or a standalone module on the users computer. The report engine 86 is in communication with the database server 22, the file archive 24, and the file archive indexer 32, the report generator 82, and the user report interface 80. The report engine 86 may also be in communication with a mail server 88, and a database connectivity module 44. The report generator 82 is in communication with the report engine 86 and the report viewer 84. The report generator 82 may be web based, and may be selected from the group consisting of crystal reports, ASP.net, and XML.

The report module 30 of the knowledge archival and recollection system 20 provides multi parameter report facilities for the retrieval of user activity data stored on the database server, or files stored on the file archive, and the generation of reports incorporating this information. The report module 30 provides the user with a variety of report options and result visualization options.

Users may invoke the user report interface 80 by an actuation method. The actuation method may be actuating an icon located in the network browser toolbar, or an icon in the system tray of the operating system. In the case of the user report interface 80 being a web-based interface, it may be invoked either through the toolbar of the network browser or by accessing a specific web address. When a user is presented with the user report interface 70, the user may input parameters according to which the user would like a report generated. According to these parameters, the stored information on the knowledge archival and recollection system 20 will be searched, and a report generated. The types of input parameters may be customized to the specific needs of the user. The input parameters will essentially pertain to the user activity data collected by the data acquisition module. Examples of input parameters for the report user interface 80 are keyword, time, user information, system information and client information. The user report interface 80 may transmit the input parameters entered by the user to the report engine 86. The report engine 86 is programmed to convert the search parameters transmitted from the user report interface 80 into a report query. The report engine 86 may transmit the report query to the database server 22. Query results from the database server 22 may be transmitted to the report generator 82. The report generator 82 processes the query results, and transmits the processed results to the report viewer 84. Both the report generator 82 and the report viewer 84 may be customized. The reports may be customized per the requirements of the organization. For example, this may include graphics, logos, selection parameters, etc. Generated reports may transmitted to the database server 22. Storing previously generated reports on the database server prevents redundant report generation.

Users may generate the same report with the same parameters multiple times, because previously generated reports are stored on the database server. The previously generated report will be returned and displayed to the user thus minimizing work carried out by the knowledge archival and recollection system 20.

Generated reports may be automatically sent from the report engine 86 to a mail server 88. Users may often be working for an employer, or on behalf of a client, who frequently requires user activity reports. To streamline the task of reporting to employers or clients, it may desirable for generated reports to be automatically transmitted to at least one specific email address.

Figure 17:
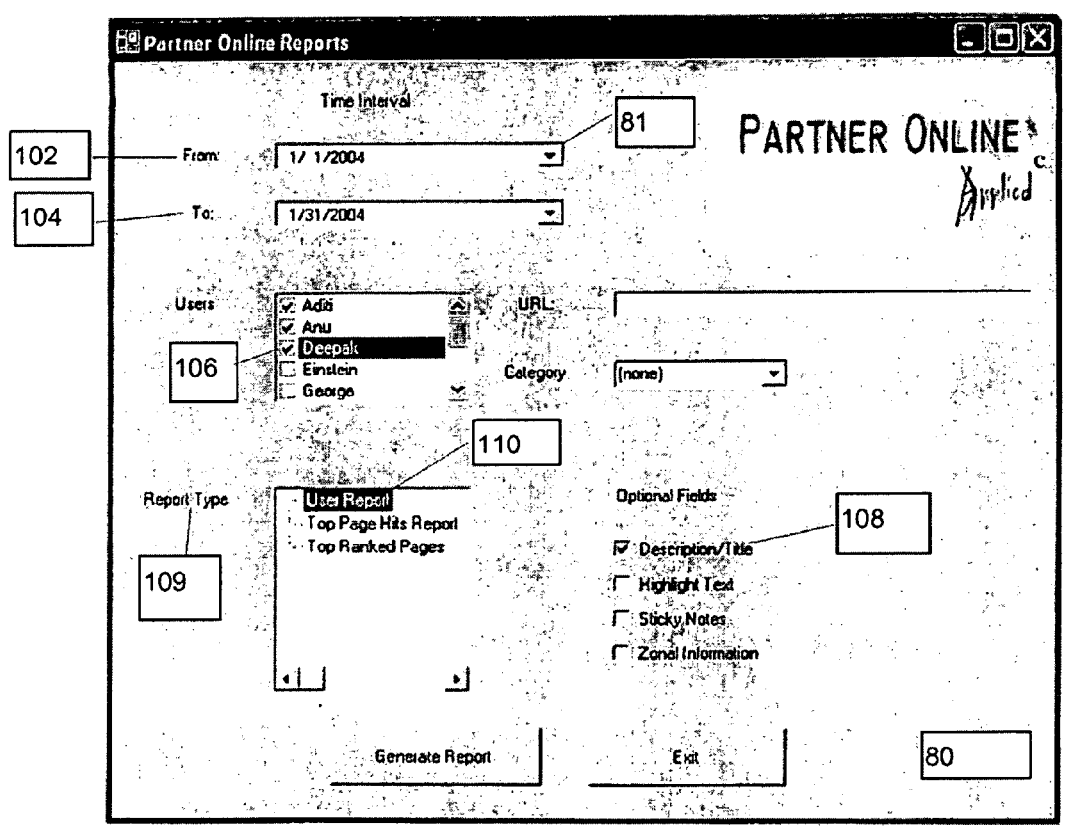
FIG. 17 depicts a screen shot of a portion of the system according to one embodiment of the present invention.

FIG. 17 depicts a screen shot of the user report interface 80 according to a preferred embodiment. This screen shot shows an example user report interface 80. The user report interface presents the user with an interface with a multitude of parameter fields 81. The user may input parameters into the respective fields parameters according to which the user would like a report generated. The user may also select what type of report they would like to have generated. The user may also select the type of user information they would like to have displayed in the generated report. In this case, the user has input parameters requesting a report for users: USER 1, USER 2, and USER 3 (as indicated by checked of boxes in filed 106) between the dates from 102 Jan. 1, 2004 and to 104 Jan. 31, 2004. The user has also selected the optional field 108 of description and title. The user has also selected the report type 109 user report 110. Given this is a valid report request, for which information exists stored on the knowledge archival and recollection system 20, the user will be presented with a report according to the input parameters.

Figure 18:
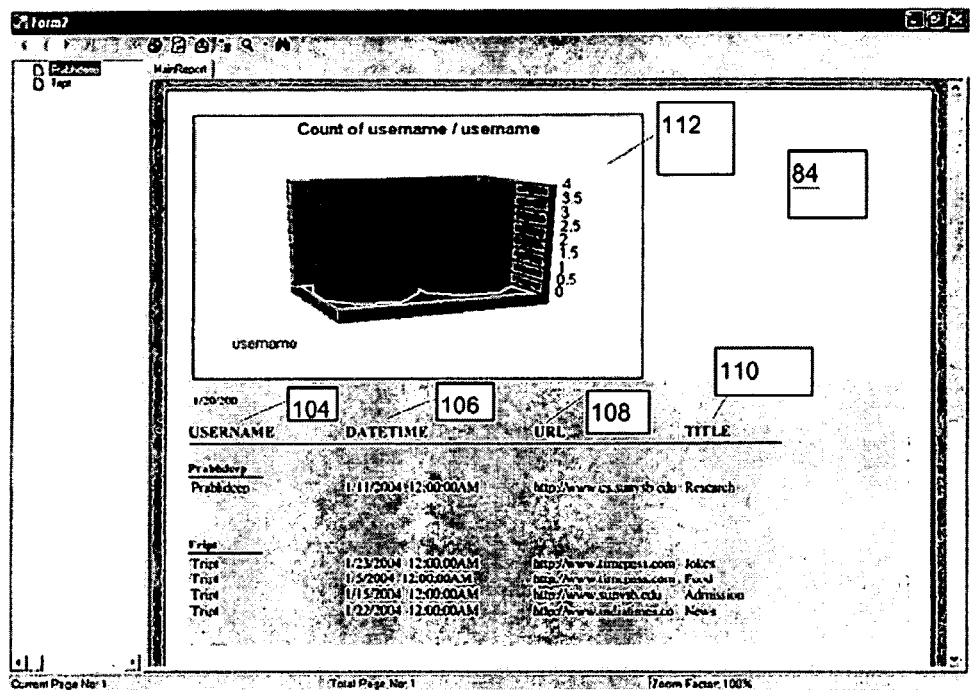
FIG. 18 depicts a screen shot of a portion of the system according to one embodiment of the present invention.

FIG. 18 depicts screen shot of the report viewer 84 according to a preferred embodiment. After submitting a report request via the user report interface 80, the user is presented with the report results. The results are displayed according to the user report type selected in the user report interface 80. The user is also presented with the specific types of information requested. As shown, the report shows a Username 104, date and time 106, url 108 and title 110. The present invention also provides a graphical representation 112 of websites visited.

Figure 19:
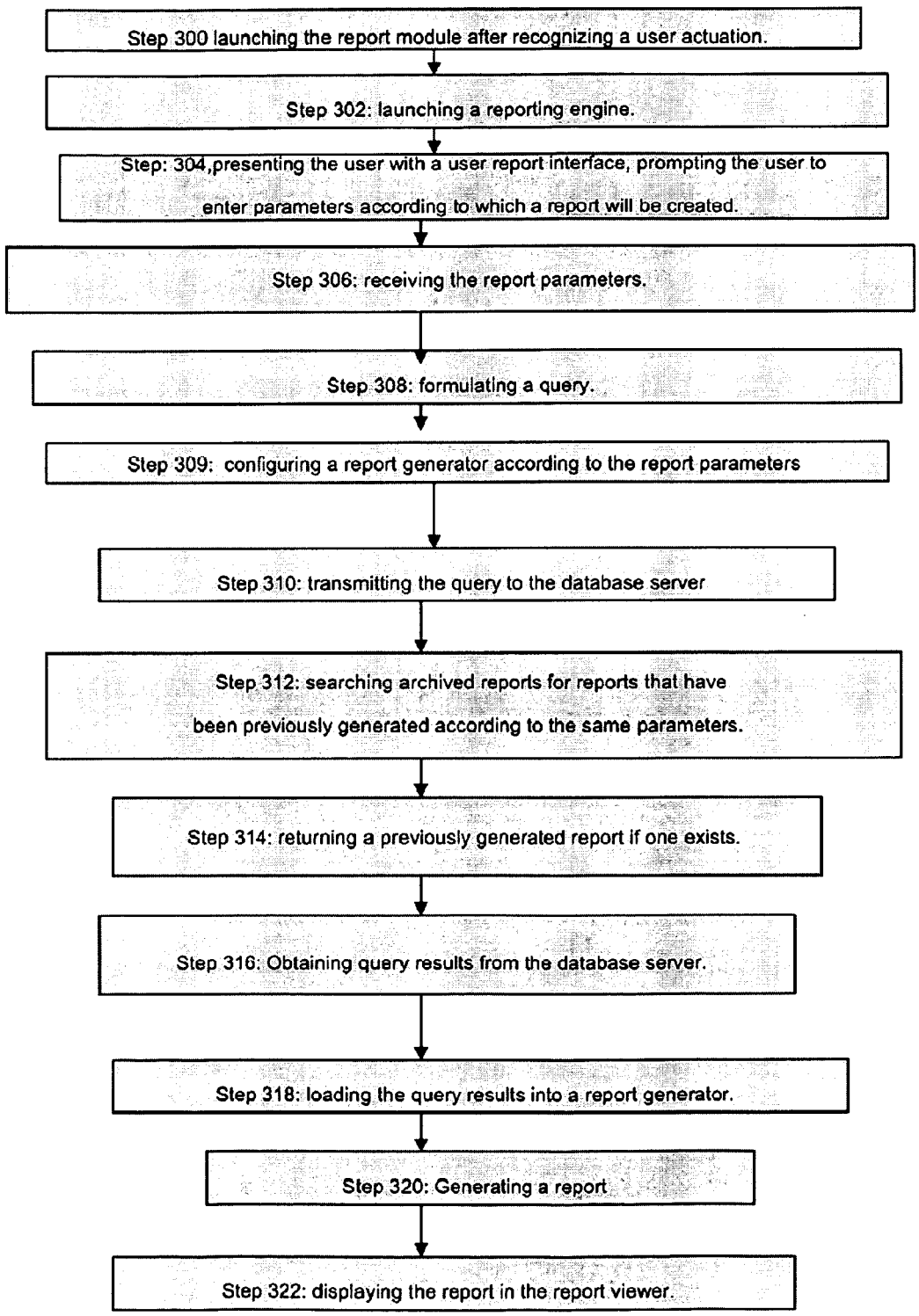
FIG. 19 depicts a method according to one embodiment of the present invention.

FIG. 19 depicts the method of implementing the report module according to a preferred embodiment. The method may include the following steps. Step 300 launching the report module 30 after recognizing a user actuation. The actuation may be clicking of an icon in the in the network browser window, the system tray of the operating system, a free floating toolbar, a hot key activation, or a context menu selection. The user may also initiate the report module 30; by starting a standalone program on the users computer or accessing a specific web address may also initiate the report module 30. Step 302: launching a reporting engine. Step: 304, presenting the user with a user report interface, prompting the user to enter parameters according to which a report will be created. Step 306: receiving the report parameters. Step 308: formulating a query. Step 308: configuring a report generator according to the report parameters. Step 310: transmitting the query to the database server 22. Step 312: searching archived reports for reports that have been previously generated according to the same parameters. Step 314: returning a previously generated report if one exists. Step 316: Obtaining query results from the database server 22. Step 318: loading the query results into a report generator. Step 320: Generating a report Step 322: displaying the report in the report viewer.

Figure 20:
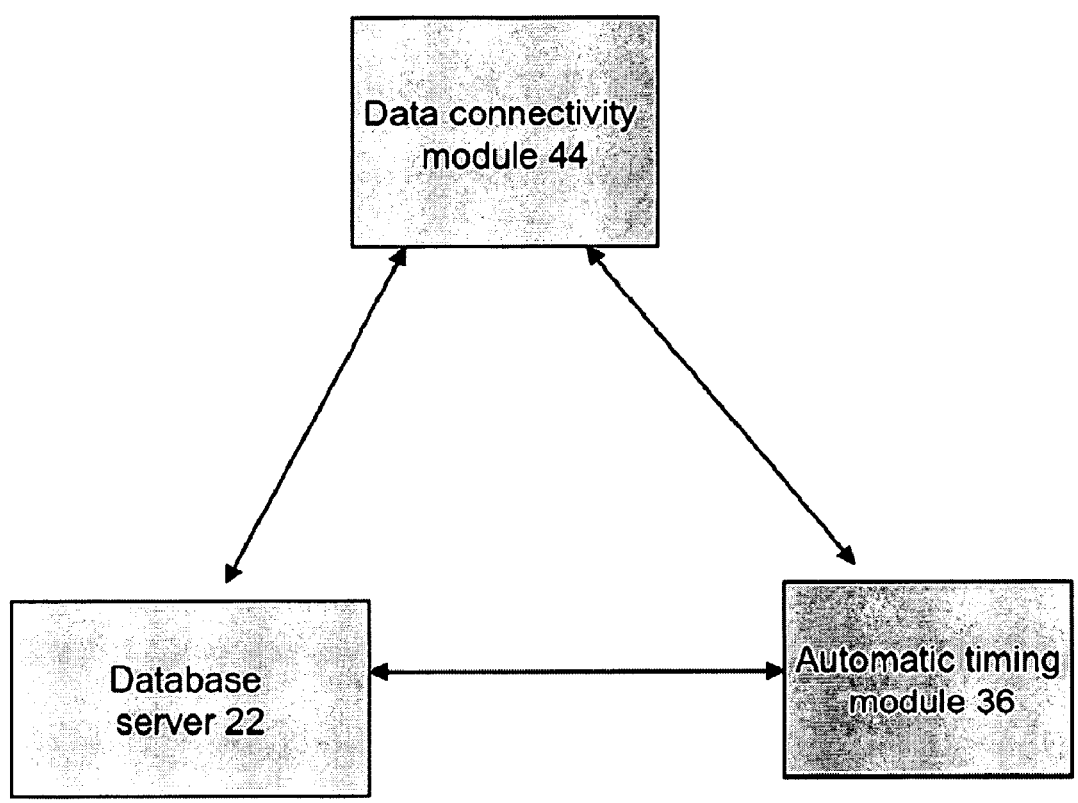
FIG. 20 depicts a portion of the system according to one embodiment of the present invention.

FIG. 20 depicts the automatic timing module 36 of the knowledge archival and recollection system 20. The automatic timing module 36 is in communication with the database server 22. The automatic timing module 36 may also be in communication with a database connectivity module 44. The automatic timing module 36 may be a standalone program on a user's computer, or may be an embedded application to the knowledge archival and recollection system 20.

As more and more work is being performed in a computer environment, there is an increased need for worker accountability. Keeping track of billable time in itself may also be time consuming, as such the knowledge archival and recollection system 20 includes an automatic timing module 36. The main function of the automatic timing module 36 is to time and record the duration of user activities in a computer environment without the hassle of extensive direct user input into a timing system.

Time logs generated by the automatic timing module 36, are transmitted and stored on the database server 22. The time logs in conjunction with their respective user activity records recorded by the data acquisition module 26 facilitate the requirements of the search module 28, billing module 38 and report module 30. User activity includes both activity online in the network browser 54, and offline in any applications on a users operating system. The application to be timed may also be chosen by the user using a simple selection menu in the network browser toolbar. These applications may be, but are not limited to, word processing applications, Internet applications or spreadsheet applications.

Figure 21:
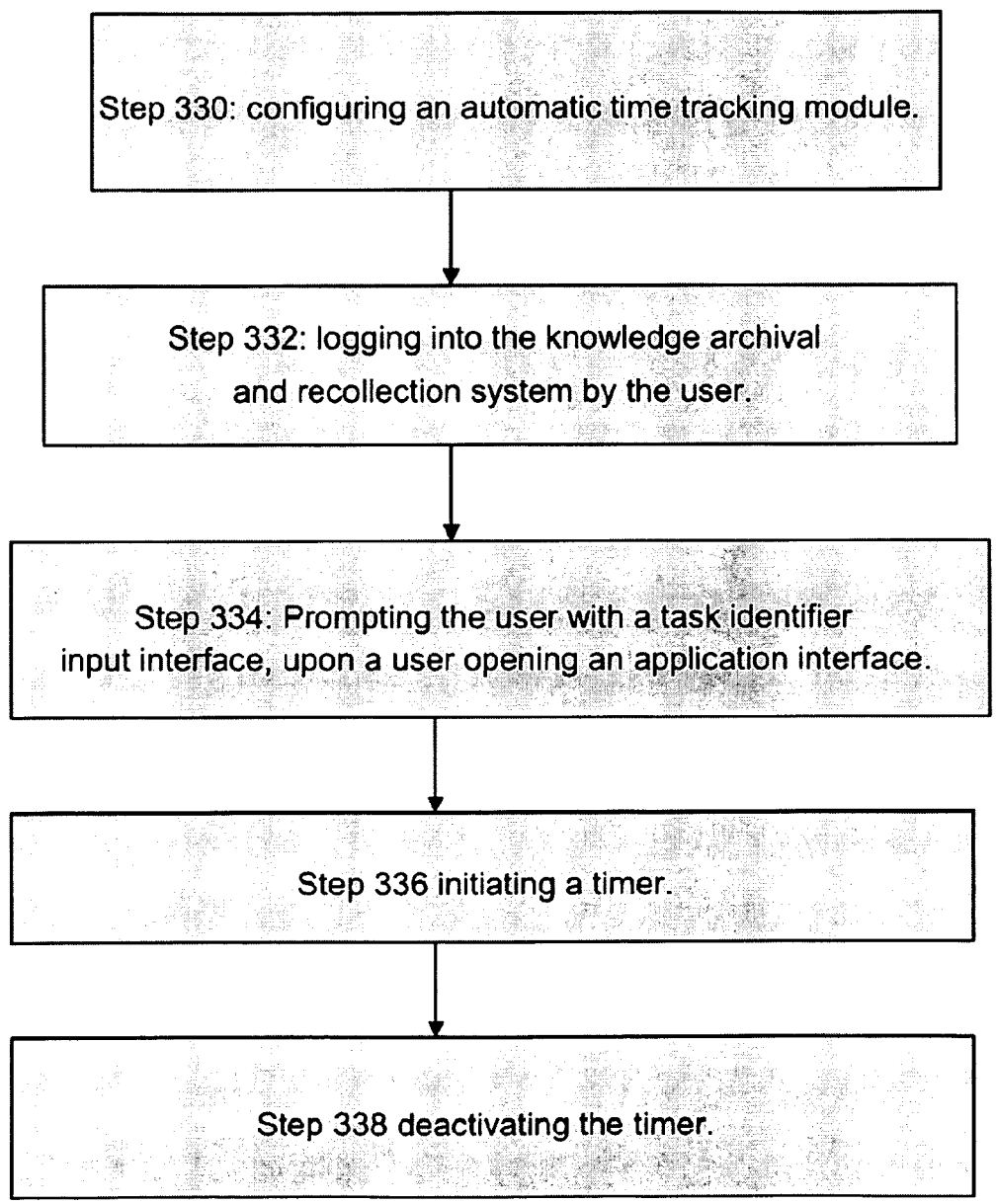
FIG. 21 depicts a method according to one embodiment of the present invention.

FIG. 21 depicts a method of timing user activity according to a preferred embodiment. The method may include the steps, Step 330: configuring an automatic time tracking module. Step 332: logging into the knowledge archival and recollection system 20 by the user. Step 334: Prompting the user with a task identifier input interface, upon a user opening an application interface. Step 336 initiating a timer. The timer may be initiated when a user logs into the system 20 or may automatically start upon the user opening an application, or may begin timing upon user actuation. The task identifier may include client identifier, a case number, task description. Step 338 deactivating the timer. The timer may be deactivated upon user logout from the knowledge archival and recollection system 20, an inactive application interface, or manual user deactivation by performing an actuation.

Figure 22:
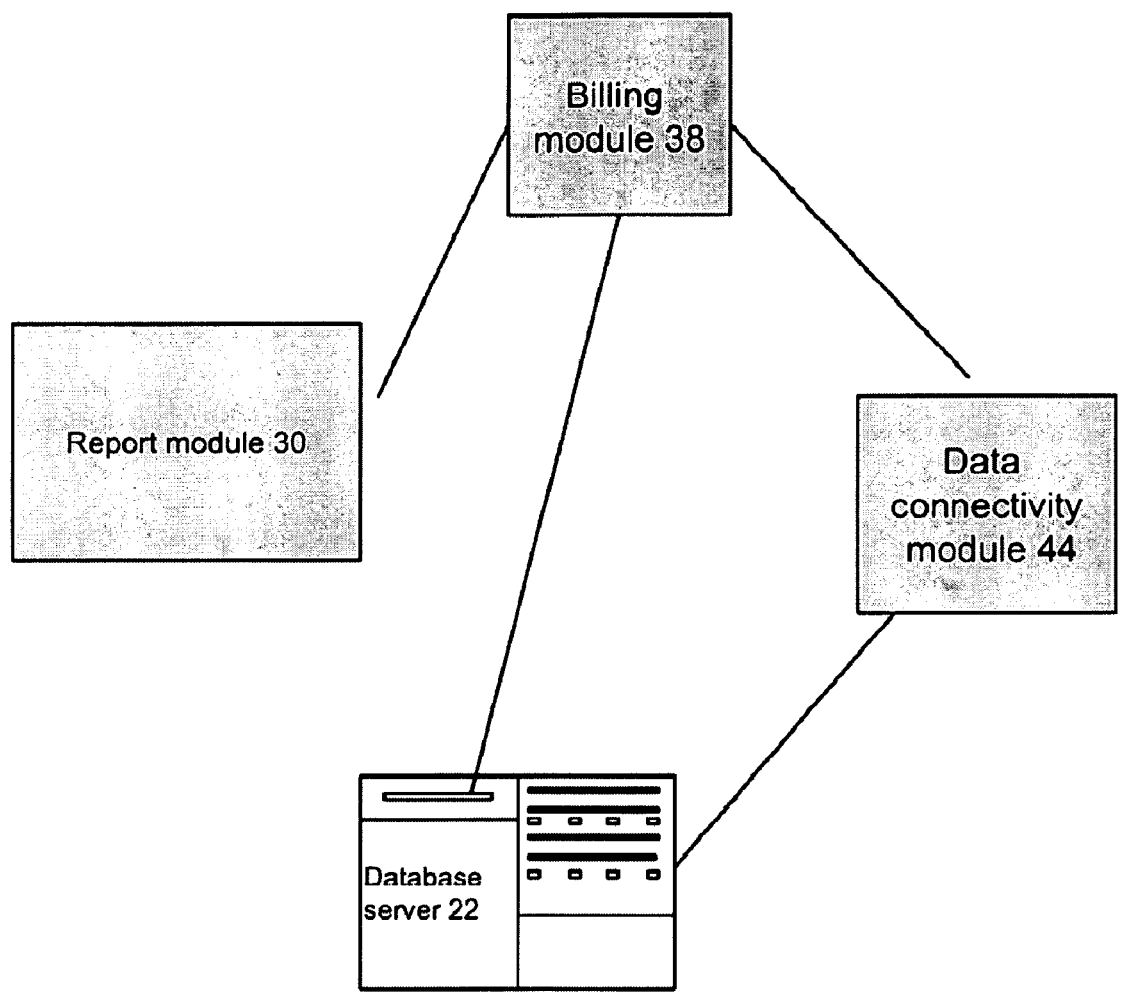
FIG. 22 depicts a portion of the system according to one embodiment of the present invention.

FIG. 22 depicts the billing module 38. The billing module 38 is in communication with the report module 30, and the database server 22. The billing module 38 may also be in communication with the database connectivity module 44. A main component to the functionality of the knowledge archival and recollection system 20 is the function of billing. Hand in hand with archiving knowledge and auditing time spent working in a computer environment is generating bills or invoices for billable work. As such, the knowledge archival and recollection system 20 may also have a billing module 38, which may automatically generate a billing report based on the data stored in the database server 22. The billing module 38 may also be in communication with the report module 30 because a bill can be characterized as a specific type of report. When the billing module 38 is initiated, a user is presented with a billing module interface. The user may input parameters into the billing module input interface. These parameters are transformed into a query and transmitted to the database server 22. A result analyzer analyzes results from the database server query. And a report generator generates a report based on these analyzed results. A user may also manually input their own billing items into the billing module 38. This may allow users to input billing data for work done not in the computer environment, providing flexible all inclusive billing functionality.

Figure 23:
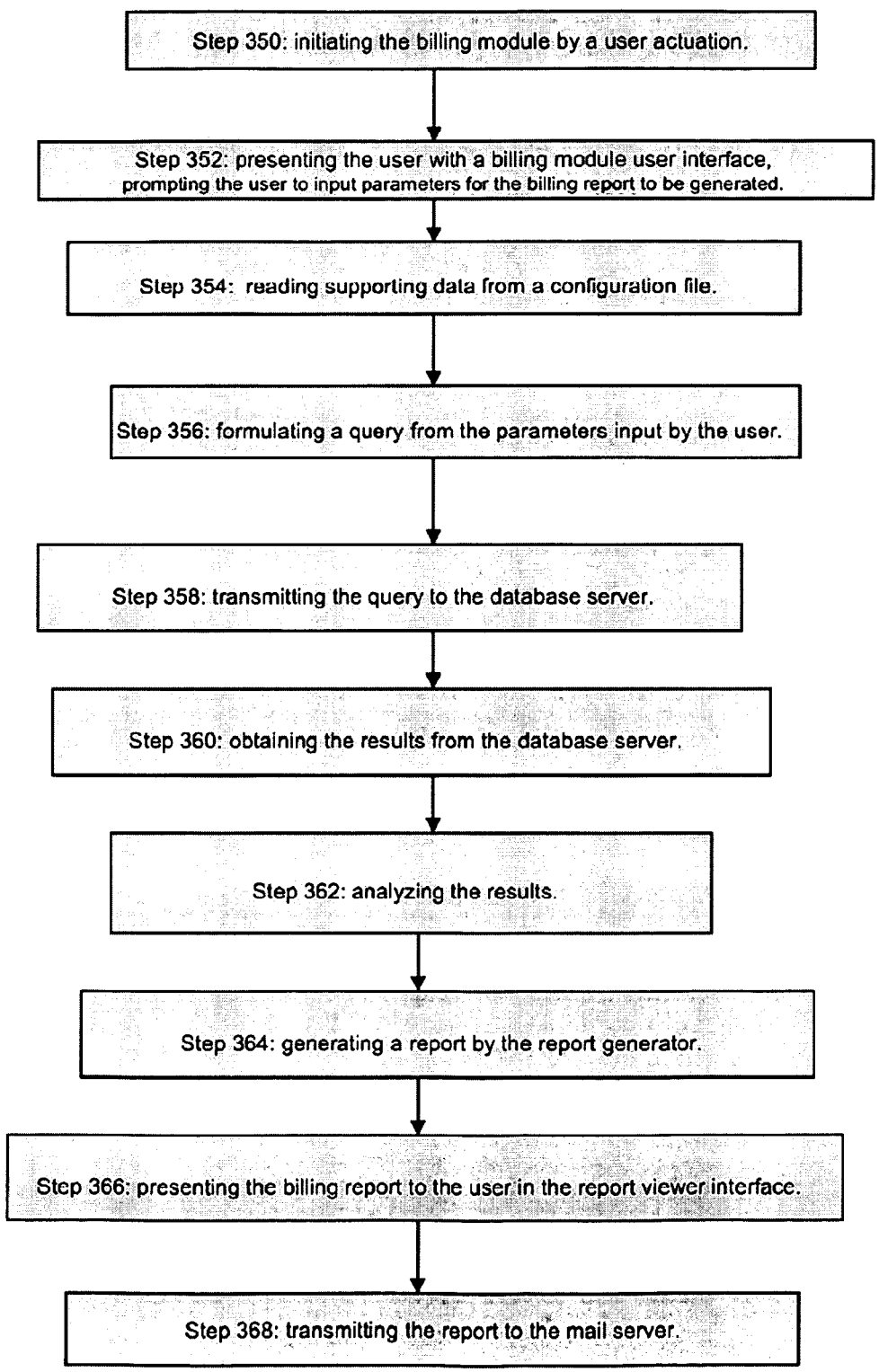
FIG. 23 depicts a method according to one embodiment of the present invention.

FIG. 23 depicts a method of running the billing module according to a preferred embodiment. The method may include the steps Step 350: initiating the billing module by a user actuation. Step 352: presenting the user with a billing module user interface, prompting the user to input parameters for the billing report to be generated. Step 354: reading supporting data from a configuration file. Step 356: formulating a query from the parameters input by the user. Step 358: transmitting the query to the database server. Step 360: obtaining the results from the database server. Step 362: analyzing the results. Step 364: generating a report by the report generator. Step 366: presenting the billing report to the user in the report viewer interface. The billing report format could be customized based on users' requirement. It could have all rates, subtotal, details billing options, brief billing options and etc. Step 368: transmitting the report to the mail server.

Figure 24:
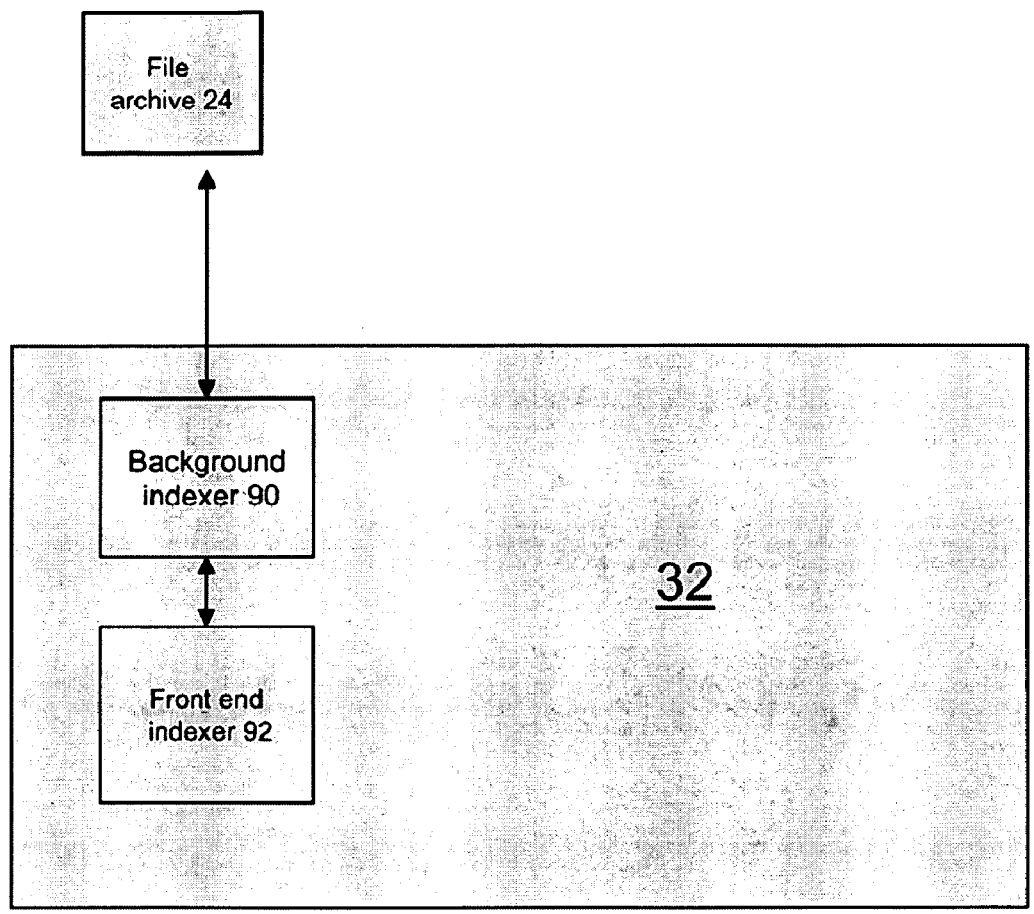
FIG. 24 depicts a portion of the system according to one embodiment of the present invention.

FIG. 24 depicts the file archive indexer 32. The file archive indexer 32 may consist of a front-end indexer 92 and a background indexer 90. The background indexer 90 is in communication with the file archive 24 and the front-end indexer 92. The front-end indexer 92 may be in communication with the search module 28 and the report module 30.

As the size of the file archive 24 begins to grow, queries to the file archive 24 from other modules take longer to process. As a result, the information stored in the file archive 24 is indexed so that the file archive 24 is easier to search and is available for faster retrieval. The background indexer 90 may apply at least one indexing algorithm to the file archive 24 to generate an index of the file archive contents. Indexing may be a time and system resource consuming function. Because there is not a high demand for a constantly updated index, indexing may therefore be done at a predetermined time interval. The index generated by the background indexer 90 may be stored on the front-end indexer 92. By storing an index of the file archive 24 contents on the front-end indexer, the search module 28 and report module 30 queries are processed by the front-end indexer.

Figure 25:
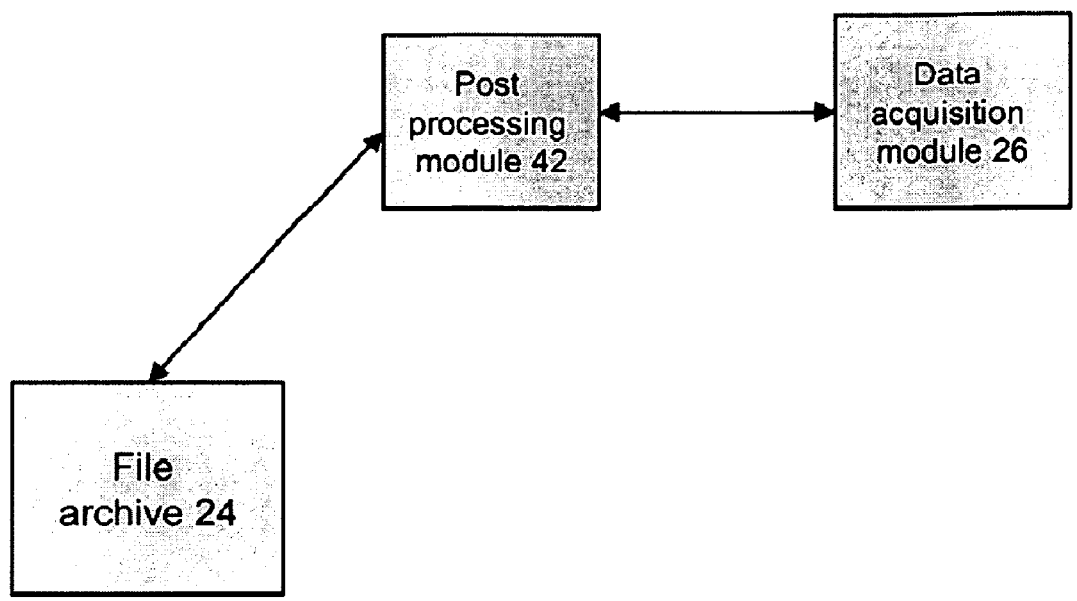
FIG. 25 depicts a portion of the system according to one embodiment of the present invention.

FIG. 25 depicts the post-processing module 42, which performs processing functions of the data collected by the data acquisition module. The post-processing module 42 is in communication with the file archive 24 and the data acquisition module 26. The post processing functions may be saving a thumbnail image of the file accessed, indexing archived file stored in the file archive, indexing data stored on the database serve, ranking the archived documents. The ranking system may be a modified weight scale comprising a user designated ranking, as well as the number of "hits" on the file. Other post-processing functions may be removing redundant information on the file archive, as well as categorization or cluster of archived documents, crating user profiles, crating website profiles, generating user search patterns, compressing/decompressing and encrypting/decrypting files stored on the file archive 24.

Figure 26:
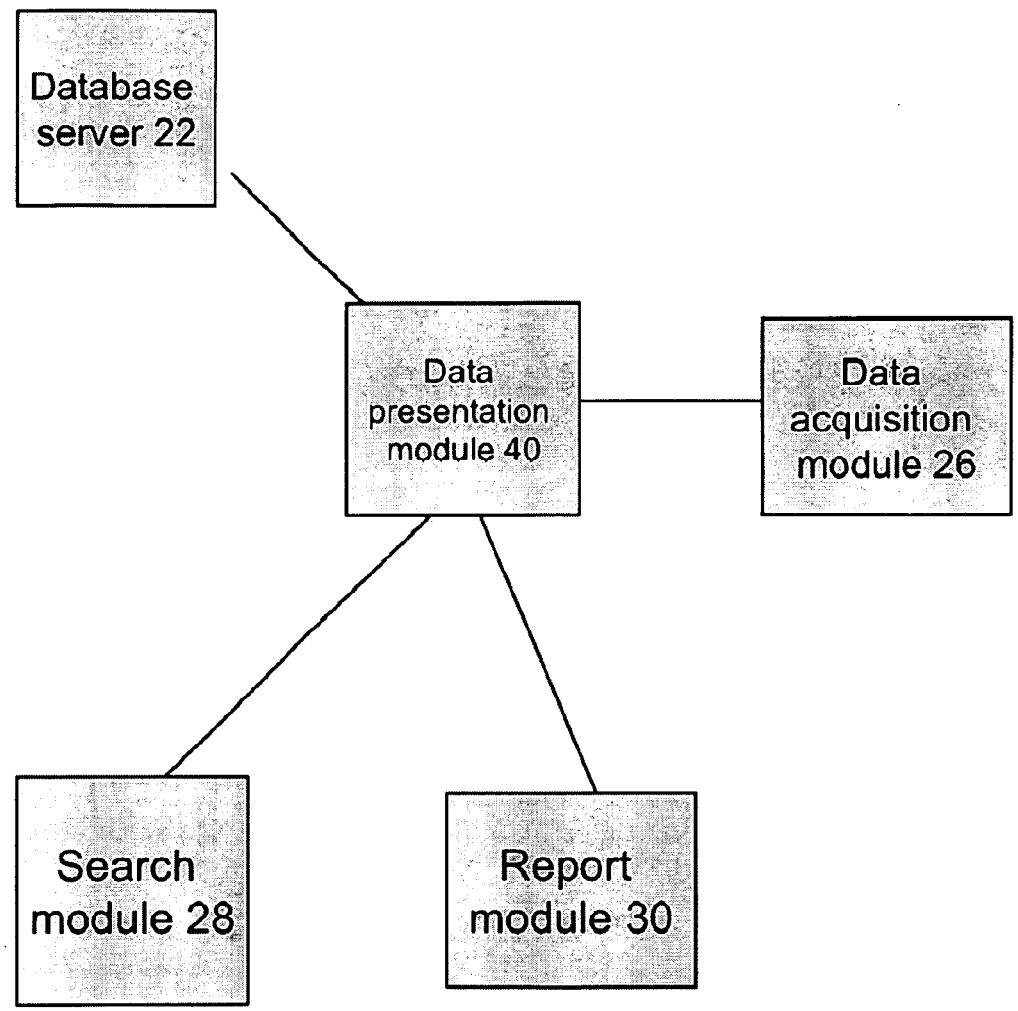
FIG. 26 depicts a portion of the system according to one embodiment of the present invention.

FIG. 26 depicts the data presentation module 40 according to a preferred embodiment. The data presentation module is in communication with the report module 30, search module 28 and database server 22. Archived data may be presented to the user through various methods. Data presentation includes displaying file modifications to a user as well as the display of report results and search results. The data presentation module 40 may work in conjunction with the data acquisition module 26. To the user, there may be no appearance of distinct modules. In theory the data presentation module 40 may be a component of the data acquisition module 26, collectively one program, just different functions. The presentation of file modifications may be performed through the network browser. An example of file modification presentation is when a user may navigate, in a network browser, to a file that has either been previously subject to file modification or currently in the process of modification. As previously described, file modifications may include annotations, rankings and highlights. The data presentation module 40 retrieves file modifications associated with the respective file accessed, and displays the file modifications to the user through the network browser window. The display of file modifications may be toggled between visible or invisible by a user actuation in a toolbar.

Another form of data presentation is the presentation of search results and report results. Through the data acquisition module 26 and the toolbar plug-in 52, a user may invoke search and report functions that are performed by the search module 28 and report module 30 respectively. Search results generated by the search module 28 are displayed through the search module interface, and reports generated by the report module 30 may be displayed to the user through the report user interface. Both the search user interface and the report user interface display the results through the network browser. In this case, the network browser plug-in 50 is in communication with the report module 30 and the search module 28.

The invention claimed is:

1. A computer implemented knowledge archival and recollection method accessible by a user for gathering, saving, and presenting user activity data, the method comprising:
    gathering and storing the user activity data, the user activity data including actual content accessed by the user;
    collecting file enhancement data, associating the file enhancement data with a file being currently accessed by the user, and transmitting the file enhancement for being stored, wherein the file enhancement data includes annotations and file insertions;
    storing the actual content accessed by the user and the file enhancement data as stored material;
    indexing the stored material using a front-end indexer and a background indexer, wherein the front-end indexer processes queries and the background indexer generates and updates indexes;
    receiving a command, including input parameters, for conducting a search of the stored material, the input parameters including keyword, date range, the user activity, the file enhancement data, criteria and graph options from the user;
    generating a customizable user activity report based on the input parameters and the user activity data; and
    presenting the report to the user,
    wherein the user activity data includes data of activity of the user on the computer including online data, being provided to the computer from a network, and offline data, being locally available on the computer,
    wherein the offline data includes files stored locally on the computer, and wherein the user activity data includes operations performed on the offline data, and
    wherein the method further comprises:
        configuring an activity tracking module;
        prompting said user with a task identifier input interface upon opening an application user interface;
        initiating a timer upon input into said input interface;
        stopping said timer upon user deactivation of said timer;
        stopping said timer upon inactive application interface; and
        storing timer data into a database server.

2. The method of claim 1, further comprising the step of stopping said timer upon user logout from said knowledge archival and recollection system.

* * * * *